(12) United States Patent
Lee et al.

(10) Patent No.: US 12,050,993 B2
(45) Date of Patent: Jul. 30, 2024

(54) DYNAMIC GRADIENT DECEPTION AGAINST ADVERSARIAL EXAMPLES IN MACHINE LEARNING MODELS

(71) Applicant: International Business Machines Corporation, Armonk, NY (US)

(72) Inventors: Taesung Lee, Ridgefield, CT (US); Ian Michael Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 17/114,819

(22) Filed: Dec. 8, 2020

(65) Prior Publication Data

US 2022/0180242 A1   Jun. 9, 2022

(51) Int. Cl.
*G06N 3/08*  (2023.01)
*G06F 16/28*  (2019.01)

(52) U.S. Cl.
CPC ............ *G06N 3/08* (2013.01); *G06F 16/285* (2019.01)

(58) Field of Classification Search
CPC .............................. G06N 3/08; G06F 16/285
USPC .......................................................... 706/12
See application file for complete search history.

(56) References Cited

U.S. PATENT DOCUMENTS

| | | | |
|---|---|---|---|
| 5,359,699 A | 10/1994 | Tong et al. | |
| 5,371,809 A | 12/1994 | Desieno | |
| 7,409,372 B2 | 8/2008 | Staelin et al. | |
| 8,275,803 B2 | 9/2012 | Brown et al. | |
| 9,390,370 B2 | 7/2016 | Kingsbury | |
| 10,642,846 B2 | 5/2020 | Gao et al. | |
| 10,657,259 B2 | 5/2020 | Lee et al. | |

(Continued)

FOREIGN PATENT DOCUMENTS

| | | | |
|---|---|---|---|
| CN | 105718945 A | 6/2016 | |
| CN | 106127729 A | 11/2016 | |

(Continued)

OTHER PUBLICATIONS

Brendel et al., "Decision-based adversarial attacks: reliable attacks against black-box machine learning models", ICLR 2018 (Year: 2018).*

(Continued)

*Primary Examiner* — Tsu-Chang Lee
(74) *Attorney, Agent, or Firm* — Stephen J. Walder, Jr.; Anthony Pallone

(57) ABSTRACT

Mechanisms are provided for obfuscating a trained configuration of a trained machine learning model. A trained machine learning model processes input data to generate an initial output vector having classification values for each of the plurality of predefined classes. A perturbation insertion engine determines a subset of classification values in the initial output vector into which to insert perturbations. A perturbation insertion engine modifies classification values in the subset of classification values by inserting a perturbation in a function associated with generating the output vector for the classification values in the subset of classification values, to thereby generate a modified output vector. The trained machine learning model outputs the modified output vector. The perturbation modifies the subset of classification values to obfuscate the trained configuration of the trained machine learning model while maintaining accuracy of classification of the input data.

20 Claims, 9 Drawing Sheets

(56) References Cited

U.S. PATENT DOCUMENTS

| | | | |
|---|---|---|---|
| 10,733,292 | B2 | 8/2020 | Araujo et al. |
| 11,017,319 | B1* | 5/2021 | Kim .................... G06F 21/14 |
| 11,227,215 | B2 | 1/2022 | Liu et al. |
| 2004/0260662 | A1 | 12/2004 | Staelin et al. |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2015/0170028 | A1 | 6/2015 | Gupta et al. |
| 2017/0011738 | A1 | 1/2017 | Senior et al. |
| 2017/0187747 | A1 | 6/2017 | Huston, III et al. |
| 2017/0206449 | A1 | 7/2017 | Lain |
| 2017/0230400 | A1 | 8/2017 | Ahmed et al. |
| 2018/0211164 | A1 | 7/2018 | Bazrafkan et al. |
| 2019/0095629 | A1 | 3/2019 | Lee et al. |
| 2019/0130110 | A1 | 5/2019 | Lee et al. |
| 2020/0311572 | A1 | 10/2020 | Baker et al. |

FOREIGN PATENT DOCUMENTS

| | | |
|---|---|---|
| CN | 106296692 A | 1/2017 |
| CN | 106845471 A | 6/2017 |
| CN | 107025284 A | 8/2017 |
| CN | 107147603 A | 9/2017 |
| CN | 107240085 A | 10/2017 |
| CN | 111295674 A | 6/2020 |
| CN | 111667049 A | 9/2020 |
| WO | WO2018028255 A1 | 2/2018 |
| WO | WO2018231708 A2 | 12/2018 |
| WO | WO2019087033 A1 | 5/2019 |

OTHER PUBLICATIONS

Anonymous, "A Method for Constraining the Generative Adversarial Neural Networks to Minimize Effect on Image Features", IP.com Prior Art Database Technical Disclosure, IP.com No. IPCOM000263056D, Jul. 27, 2020, 4 pages.

Anonymous, "Fast adversarial retraining", IP.com Prior Art Database Technical Disclosure, IP.com No. IPCOM000259987D, Oct. 7, 2019, 4 pages.

Anonymous, "Method and System for Optimizing Deep Neural Networks using Evolutionary Stochastic Gradient Descent (ESGD)", IP.com Prior Art Database Technical Disclosure, IP.com No. IPCOM000255747D, Oct. 11, 2018, 3 pages.

Dhillon, Guneet S. et al., "Stochastic Activation Pruning for Robust Adversarial Defense", Sixth International Conference on Learning Representations (ICLR '18), Apr. 30-May 3, 2018, 13 pages.

High, Rob, "The Era of Cognitive Systems: An Inside Look at IBM Watson and How it Works", IBM Corporation, Redbooks, Dec. 12, 2012, 16 pages.

Lee, Taesung et al., "Defending Against Machine Learning Model Stealing Attacks Using Deceptive Perturbations", Association for the Advancement of Artificial Intelligence, 2019, submitted version arXIV: 1806.00054v4 [cs.LG], Dec. 13, 2018, 8 pages.

Qiu, Shilin et al., "Review of Artificial Intelligence Adversarial Attack and Defense Technologies", Appl. Sci. 2019, 9(5), 909, Mar. 2019, 29 pages.

Sengupta, S. et al., "MTDeep: Boosting the Security of Deep Neural Nets Against Adversarial Attacks with Moving Target Defense", arXiv: 1705.07213v3 [cs.LG], Aug. 3, 2019, 22 pages.

Yuan, Michael J., "Watson and healthcare", IBM Corporation, IBM developerWorks, http://www.ibm.com/developerworks/industry/library/ind-watson/, Apr. 12, 2011, 14 pages.

List of IBM Patents or Patent Applications Treated as Related, Apr. 15, 2021, 2 pages.

Google. Cloud vision API. [Online]. Available: https://cloud.google.com/vision/, Accessed from the Internet on Aug. 6, 2019, 23 pages.

IBM. Watson visual recognition. [Online]. Available: https://www.ibm.com/watson/services/visual-recognition/pricing/index.html#pricing, Accessed from the Internet on Aug. 6, 2019, 4 pages.

International Search Report and Written Opinion dated Feb. 20, 2019 for International Application No. PCT/IB2018/058438, 9 pages.

"Cognitive services pricing—computer vision API", Microsoft. [Online]. Available: https://azure.microsoft.com/en-us/pricing/details/cognitive-services/computer-vision/, Accessed from the Internet on Aug. 6, 2019, 7 pages.

Bucila, Cristian et al., "Model Compression", In Proceedings of the 12th ACM SIGKDD international conference on Knowledge discovery and data mining (KDD'06), Aug. 20-23, 2006, 7 pages.

Carlini, Nicholas et al., "Towards Evaluating the Robustness of Neural Networks", 2017 IEEE Symposium on Security and Privacy, May 22-24, 2017, pp. 39-57.

Chollet, Francois, "Xception: Deep Learning with Depthwise Separable Convolutions", IEEE conference on Computer Vision and Pattern Recognition (CVPR), Jul. 2017, pp. 1251-1258.

Ciresan, Dan et al., "Multi-column Deep Neural Networks for Image Classification", IEEE Conference on Computer vision and pattern recognition (CVPR), Jun. 2012 . 8 pages.

Coates, Adam et al., "An Analysis of Single-Layer Networks in Unsupervised Feature Learning", In Proceedings of the fourteenth international conference on artificial intelligence and statistics, Apr. 2011, 9 pages.

Goodfellow, Ian J. et al., "Explaining and Harnessing Adversarial Examples", 3rd International Conference on Learning Representations (ICLR2015), arXiv: 1412.6572v3 [stat.ML], Mar. 20, 2015, pp. 1-11.

Grosse, Kathrin et al., "Adversarial Perturbations Against Deep Neural Networks for Malware Classification", {Online}, Jun. 16, 2016, {retrieved Jul. 25, 2019}. Retrieved from the Internet: https://arxiv.org/pdf/1606.04435.pdf, 2016, 13 pages.

He, Kaiming et al., "Deep Residual Learning for Image Recognition", 29th IEEE Conference on Computer Vision and Pattern Recognition (CVPR2016), Jun. 26-Jul. 1, 2016, pp. 1-12. (Version attached: arXiv: 1512.03385v1 [cs.CV]—Dec. 10, 2015).

Hinton, Geoffrey et al., "rmsprop: Divide the gradient by a running average of its recent magnitude", Lecture 6a, Overview of mini-batch gradient descent, http://www.cs.toronto.edu/~tijmen/csc321/slides/ lecture_slides_lec6.pdf, accessed: Apr. 23, 2018., 31 pages.

Howard, Andrew G. et al., "Mobilenets: Efficient Convolutional Neural Networks for Mobile Vision Applications", arXiv preprint arXiv:1704.04861, Apr. 17, 2017, 9 pages.

Kingma, Diederik P. et al., "Adam: A Method for Stochastic Optimization", arXiv preprint arXiv:1412.6980, 2014, Jan. 30, 2017, 15 pages.

Krizhevsky, Alex, "Learning Multiple Layers of Features from Tiny Images", University of Toronto, Tech. Rep., Apr. 8, 2009, 60 pages.

Lecun, Yann et al., "Gradient-Based Learning Applied to Document Recognition", Proceedings of the IEEE, vol. 86, No. 11, Nov. 1998, pp. 2278-2324.

Liao, Qianli et al., "Theory of Deep Learning II: Landscape of the Empirical Risk in Deep Learning", Center for Brains Minds + Machines, CBMM Memo No. 066, {retrieved Jul. 25, 2019}, Retrieved from the Internet: https://arxiv.org/pdf/1703.09833.pdf, Jun. 2017, 45 pages.

Lichman, M., "UCI machine learning repository", 2013. [Online]. Available: http://archive.ics.uci.edu/ml, Accessed from the Internet on Aug. 6, 2019, 2 pages.

Luo, Yixin et al., "Deep Learning with Noise", {online}, archived on Internet as of at least Jun. 2016, {retrieved Jul. 25, 2019}, retrieved from the Internet https://pdfs.semanticscholar.org/d79b/a428e1cf1b8aa5d320a93166315bb30b4765.pdf, Jun. 2016, 9 pp.

Maas, Andrew L. et al., "Learning Word Vectors for Sentiment Analysis", In Proceedings of the 49th Annual Meeting of the Association for Computational Linguistics: Human Language Technologies. Portland, Oregon, USA: Association for Computational Linguistics, Jun. 2011, pp. 142-150.

Marr, Bernard et al., "What Everyone Should Know About Cognitive Computing", {Online}, Mar. 23, 2016, {retrieved Jul. 25, 2019}. Retrieved from the Internet: https://www.forbes.com/sites/

(56) References Cited

OTHER PUBLICATIONS bernardmarr/2016/03/23/what-everyone-should-know-about-cognitive-computing/#6da9c7eb5088, 2016, 9 pages.

McCord, M.C. et al., "Deep parsing in Watson", IBM J. Res. & Dev. vol. 56 No. 3/4 Paper 3, May/Jul. 2012, pp. 3:1-3:15.

Papernot, Nicholas et al., "Practical Black-Box Attacks Against Machine Learning", Proceedings of the 2017 ACM on Asia Conference on Computer and Communications Security, New York, NY, [Online]. Available: http://doi.acm.org/10.1145/3052973.3053009, Apr. 2017, pp. 506-519.

Papernot, Nicolas et al., "The Limitations of Deep Learning in Adversarial Settings", IEEE European Symposium on Security and Privacy 2016, arXiv: 1511.07528v1 [cs.CR], Nov. 24, 2015, Mar. 2016, 16 pages.

Perekrestenko, Dmytro, "Layer-bylayer visualizations of MNIST dataset feature representations", https://lts2.epfl.ch/blog/perekres/2015/02/21/layer-by-layer-visualizations-of-mnist-dataset-feature-representations/ , Institute of Electrical Engineering of the EPFL, LTS2, Feb. 21, 2015, 5 pages.

Ringger, Eric K. et al., "Assessing the Costs of Machine-Assisted Corpus Annotation through a User Study", Proceedings of the 2008 International Conference on Language Resources and Evaluation (LREC), May 26-Jun. 1, 2008, 7 pages.

Romero, Adriana et al., "FitNets: Hints for Thin Deep Nets", CoRR abs, arXiv:1412.6550v4, Mar. 2015, 13 pages.

Sanfelix, Eloi et al., "Unboxing the White-Box, Practical attacks against Obfuscated Ciphers", Riscure, 2015, 38 pages.

Schuster, Mike et al., "Bidirectional Recurrent Neural Networks", IEEE Transactions on Signal Processing, vol. 45, No. 11, Nov. 1997, pp. 2673-2681.

Shi, Yi et al., "How to Steal a Machine Learning Classifier with Deep Learning", 2017 IEEE International Symposium on Technologies for Homeland Security (HST), Apr. 2017, pp. 1-5.

Springenberg, Jost T. et al., "Striving for Simplicity: The All Convolutional Net", CoRR, vol. abs/1412.6806, 2014. [Online]. Available: http://arxiv.org/abs/1412.6806, v3, Apr. 13, 2015, 14 pages.

Szegedy, Christian et al., "Rethinking the Inception Architecture for Computer Vision", Proceedings of the IEEE Conference on Computer Vision and Pattern Recognition, Jun. 2016, 10 pages.

Tramer, Florian et al., "Stealing Machine Learning Models via Prediction APIs", 25th USENIX Security Symposium, Aug. 10-12, 2016, pp. 601-618.

Tramer, Florian et al., "Stealing Machine Learning Models via Prediction APIs", 25th USENIX Security Symposium (USENIX Security 16), Aug. 2016, 19 pages.

Wang, Binghui et al., "Stealing Hyperparameters in Machine Learning", 39th IEEE Symposium on Security and Privacy (SP), May 2018, 17 pages.

Xiao, Han et al., "Fashion-MNIST: A Novel Image Dataset for Benchmarking Machine Learning Algorithms", arXiv: 1708.07747v2 [cs.LG], Sep. 15, 2017, 6 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

\* cited by examiner

DYNAMIC GRADIENT DECEPTION AGAINST ADVERSARIAL EXAMPLES IN MACHINE LEARNING MODELS

BACKGROUND

The present application relates generally to an improved data processing apparatus and method and more specifically to mechanisms for protecting machine learning models against adversarial example based attacks by using dynamic gradient deception.

Neural network based deep learning is a class of machine learning model that uses a cascade of many layers of nonlinear processing units for feature extraction and transformation. Each successive layer uses the output from the previous layer as input. The machine learning algorithms used to train these machine learning models may be supervised or unsupervised and applications include pattern analysis (unsupervised) and classification (supervised).

Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models, such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method for obfuscating a trained configuration of a trained machine learning model is provided. The method is performed in a data processing system comprising at least one processor and at least one memory, the at least one memory comprising instructions executed by the at least one processor to specifically configure the at least one processor to implement the trained machine learning model, a selecting classification output perturbation engine, and a perturbation insertion engine. The method comprises processing, by the trained machine learning model, input data to generate an initial output vector having classification values for each of the plurality of predefined classes. Moreover, the method comprises determining, by the perturbation insertion engine, a subset of classification values in the initial output vector into which to insert perturbations. The subset of classification values is less than all of the classification values in the initial output vector. In addition, the method comprises modifying, by the perturbation insertion engine, classification values in the subset of classification values by inserting a perturbation in a function associated with generating the output vector for the classification values in the subset of classification values, to thereby generate a modified output vector. Furthermore, the method comprises outputting, by the trained machine learning model, the modified output vector. The perturbation modifies the subset of classification values to obfuscate the trained configuration of the trained machine learning model while maintaining accuracy of classification of the input data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
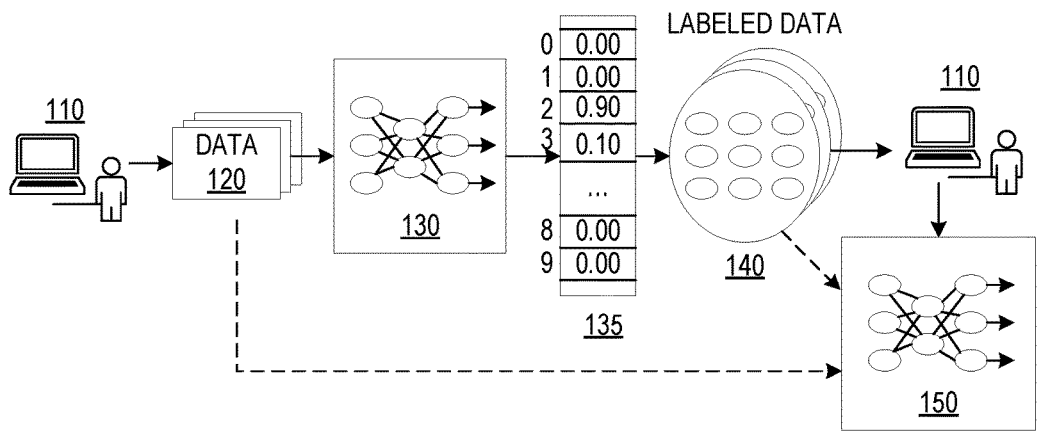
FIGS. 1A and 1B are block diagrams illustrating the problem of model stealing attacks addressed by the present invention and the solution offered by the mechanisms of the illustrative embodiments.

The illustrative embodiments provide mechanisms for protecting cognitive systems, such as those comprising neural networks, machine learning, and/or deep learning mechanisms, from attacks using a gradient or its estimation, such as model stealing attacks and evasion attacks. While the illustrative embodiments will be described in the context of a neural network based mechanism and cognitive system, the illustrative embodiments are not limited to such. Rather, the mechanisms of the illustrative embodiments may be utilized with any artificial intelligence mechanism, machine learning mechanism, deep learning mechanism, or the like, whose output may be modified in accordance with the illustrative embodiments set forth hereafter to thereby obfuscate the training of the internal mechanisms, e.g., machine learning computer models (or simply "models"), neural networks of various types, e.g., recurrent neural networks (RNNs), convolutional neural networks (CNNs), deep learning (DL) neural networks, cognitive computing systems implementing machine learning computer models, or the like. The obfuscation of the training of the internal mechanisms results in the gradients not being able to be accurately computed and thus, the internal mechanisms are not able to be reproduced via a model stealing attack, or the adversarial examples are not able to be created to make the model misclassify. These machine learning based mechanisms will be collectively referred to herein as computer "models" and this term is meant to refer to any type of machine learning computer model of various types that may be subjected to gradient based attacks.

The illustrative embodiments introduce noise into the output of a protected cognitive system that prevents an external party from being able to reproduce the configuration and training of a cognitive system. That is, the noise obscures the actual output generated by the cognitive system while maintaining the correctness of the output. In this way, the cognitive system can be used to perform its operations while preventing others from generating their own version of the trained and configured cognitive system that would generate correct output. While an attacker may be able to assume the noisy output to be correct output for training their own cognitive system model, the attacker's model will still not generate the same output of the cognitive system model that the attacker is attempting to recreate. This is because even with a noisy output, the correct output may be one of multiple possibilities, and only the exact same cognitive system model architecture, with the same model weights, can correctly identify which of the multiple possibilities is the correct one. Moreover, the illustrative embodiments provide for correct output of the model while preventing evasion attacks, i.e. attacks in which the attacker introduces noise that forces a misclassification without raising suspicion, since the mechanisms of the illustrative embodiments introduce noise to prevent gradient determinations, but provides mechanisms for ensuring that misclassification of the output is prevented.

The success of neural network based systems has resulted in many web services based on them. Service providers provide application program interfaces (APIs) to end users of the web services through which the end users may submit, via their client computing devices, input data to be processed by the web service, and are provided results data indicating the results of the operations of the web services on the input data. Many times, cognitive systems utilize the neural networks to perform classification type operations to classify input data into various defined categories of information. For example, in an image processing web service, an input image comprising a plurality of data points, e.g., pixels, may be input to the web service which operates on the input image data to classify elements of the input image into types of objects present within the image, e.g., the image comprises a person, a car, a building, a dog, etc., to thereby perform object or image recognition. Similar types of classification analysis may be performed for various other types of input data including, but not limited to, speech recognition, natural language processing, audio recognition, social network filtering, machine translation, and bioinformatics. Of particular interest to some illustrative embodiments described herein, such web services may provide functionality for analyzing patient information in patient electronic medical records (EMRs) using natural language processing, analyzing medical images such as x-ray images, magnetic resonance imaging (MRI) images, computed tomography (CT) scan images, etc., and the like.

In many cases, the service providers charge the end users a fee for the use of the web service that is provided by the implementation of a neural network based cognitive system. However, it has been recognized that end users may utilize the APIs provided by the service provider to submit sets of input data to acquire enough output data to replicate the training of the neural network of the cognitive system such that the end user is able to generate their own trained neural network and thereby avoid having to utilize the service provider's service, resulting in a loss of revenue for the service provider. That is, if the end user is utilizing the service provider's web service to label a set of input data based on a classification operation performed on the input data, after submitting enough input data sets, e.g., 10,000 input data sets (where the term "data set" as used herein refers to a set of one or more data samples), and obtaining the corresponding output labels, the output labels may be used as a "golden" set or ground truth for training another neural network, e.g., the end user's own neural network, to perform a similar classification operation. This is referred to herein as a model stealing attack in that an end user, referred to hereafter as an "attacker", motivated to recreate the trained neural network surreptitiously, attempts to steal the neural network model created and trained by the service provider through utilization of the service provider's APIs.

The illustrative embodiments reduce or eliminate the attacker's ability to perform an attack using gradients or their estimations, such as model stealing attack and evasion attack by introducing perturbations, or noise, into the output probabilities generated by the neural network, so as to produce misleading gradient that protects against the attacker who is trying to copy or evade the neural network model. The perturbations (noise) that are introduced deviate the attacker's gradients from a correct direction and amount and minimize loss in the accuracy of the protected neural network model. To satisfy these two criteria, in some illustrative embodiments, two general guidelines are followed when generating the perturbations: (1) using the perturbation, one or more ways of learning the machine learning parameters are added to cause ambiguity in the gradients, e.g., in one illustrative embodiment, the sign of the first order derivative is reversed (the first order derivative identifies the direction, e.g., increasing/decreasing, of a function or curve); and (2) noise is added primarily in either end of the function, e.g., in a softmax or sigmoid function, up to +/−0.5.

It should be appreciated that these are only example guidelines for some illustrative embodiments and many different modifications may be made to these without departing from the spirit and scope of the present invention. For example, the activation functions need not be softmax or sigmoid functions, as these were chosen for the illustrative embodiments due to their standard use for deep learning classifiers. Any activation function of the protected neural network may be utilized in which ambiguity is added by way of the introduction of noise in accordance with the illustrative embodiments.

In general, the illustrative embodiments provide various methods and mechanisms to add perturbations without negatively affecting the accuracy of the model or neural network. For example, any noise may be added to the activation function of the model or neural network to thereby cause ambiguity in the output that will fool a gradient-based attacker. However, in some illustrative embodiments, the perturbation mechanisms of the illustrative embodiments add any noise that does not change the result classification, i.e. the output of the class with the highest probability, generate by the trained model or neural network. That is, given an output probability vector $y=[y\_1, \ldots, y\_n]$, the perturbation mechanisms of these illustrative embodiments may add noise d such that $\text{argmax}\_i\ \{y\_i+d\_i\} = \text{argmax}\_i\ \{y\_i\}$.

For added ambiguity in the output of the trained model or neural network, the perturbation mechanisms of the illustrative embodiments may add noise that causes not only the ambiguity, but also a sign change of gradients. In such an embodiment, the perturbation mechanisms add larger perturbations to clear cases such that the probability of a class is close to either 1 or 0 and thus, the result class of an output is likely to be preserved. Also, by adding noise to these cases, the perturbation mechanisms add ambiguity of learning. Lastly, by the added noise, the direction of gradients are opposite to the original gradients as the original model has higher probability with clearer cases as oppose to the perturbed output having lower probability with clearer cases.

There may be many different implementations of the perturbations that satisfy this criteria and all such perturbations are considered to be within the spirit and scope of the present invention. That is any functions that generate perturbations in the output of the neural network which satisfy the above criteria and guidelines may be used without departing from the spirit and scope of the present invention.

For example, assume there is a given a neural network $f(x) = \text{sigma}(h(x))$ where sigma is a softmax or sigmoid function, $h(x)$ is the function representing the remainder of the neural network, and x is the input data. Various possible perturbations satisfy the above criteria and guidelines, examples of which are as follows:

1. Copy-protect($f(x)$)=normalization(sigma($h(x)$)−0.5 (sigma($0.25h(x)$) 0.5));

2. Gaussian noise up to +/−0.5 on [h1,inf) and (−inf,−h1] where h1 is minimum $h(x)$ such that sigma ($h(x)$)>0.99; and 3. Random noise $h'(x)$ such that the ranking of dimensions of sigma($h(x)+h'(x)$) is equal to sigma($h(x)$).

where normalization is an identity function if sigma is the sigmoid function, or is a function that divides the input vector by the sum of its values if sigma is the softmax function.

In the example perturbation 1 above, ambiguous cases are kept as-is, however the perturbation makes the output of the model or neural network less certain if the output for the same input is more certain, up to 0.5 which keeps the result class the same. That is, the higher the probability/confidence for the original model, the lower the probability/confidence for the protected model.

In the example perturbation 2 above, a type of random noise (which is called Gaussian noise) is added when the output is certain or probable, i.e. the probability of the classification is high, e.g., 1.0, 0.9, etc. depending on the implementation. The difference between perturbation 1 above and perturbation 2 above is that perturbation 1 adds more noise if the result is more certain while perturbation 2 does not require such ordering and thus, the more certain outputs may have less noise in some cases. Perturbation 3 adds noise that does not change the relative order of likely classes given the input data, e.g., if the input image data is more likely to be a bird than a cow, for example, then the perturbation adds noise as long as this order is preserved.

These perturbations minimize the change in boundary case, such as $f(x)=0.5$, such that there is almost no change in this area, but if the probability score is high, e.g., closer to $f(x)=1.0$, or low, e.g., closer to $f(x)=0.0$, the perturbation is large. However, in this case, the ranking of the output classifications do not change because the change is up to +/−0.25 for the highest ranked classification (#1), and 1.0−0.25=0.75 is still the highest probability score among the classifications. That is, if the original probability of a classification is 1.0 and, through the introduction of noise in accordance with illustrative embodiments set forth herein, the probability is reduced to 0.75, then this may still be considered high and the classification of the input remains the same. However, if the probability were to drop to 0.5, then the average user would consider this to be uncertain, indicating that the output may not be useable and further analysis may be required.

Thus, the mechanisms of the illustrative embodiments improve the operation of the neural network and the cognitive system implementing the neural network, by adding additional non-generic functionality that previously did not exist in the neural network mechanism or cognitive system, specifically for avoiding model stealing and/or evasion attacks. The mechanisms of the illustrative embodiments add additional technological logic in the neural network and cognitive system that specifically implements the introduction of perturbations following the criteria and guidelines noted above to allow for obfuscation of the training of the neural network, machine learning model, deep learning model, or the like, while maintaining the usability of the resulting output, e.g., the classification and labeling of the output data is still accurate even though the actual probability values generated by the model are not accurate to the training of the model. The mechanisms of the illustrative embodiments are specific to a technological environment involving one or more data processing systems and/or computing devices that are specifically configured to implement the additional logic of the present invention thereby resulting in a non-generic technological environment comprising one or more non-generic data processing systems and/or computing devices. Moreover, the illustrative embodiments are specifically directed to solving the technological problem of model stealing attacks involving the reproducing of the training of specialized computing devices having neural network models, machine learning models, deep learning models, or other such artificial intelligence or cognitive operation based computing mechanisms. Furthermore, the illustrative embodiments solve the technological problem of model evasion attacks involving the determining of a right level of noise to introduce, based on a determined gradient of the trained model, in order to cause the model to misclassify an input.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be software, hardware and/or firmware, or any combination thereof, that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
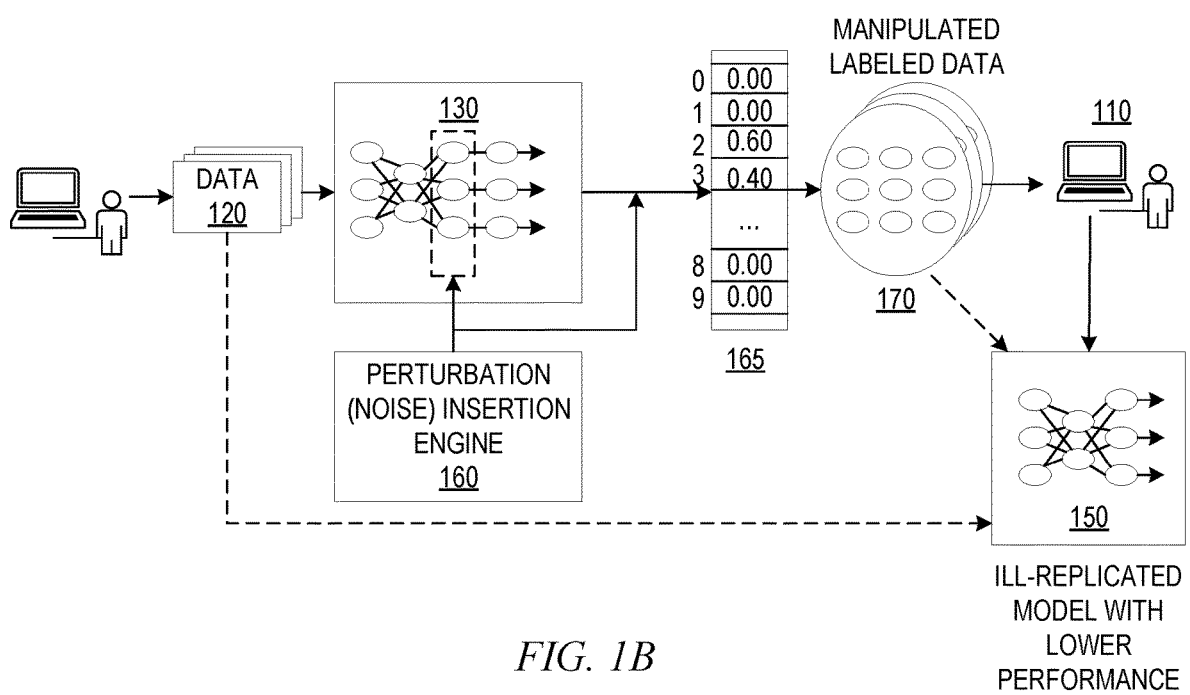
Figure 1C:
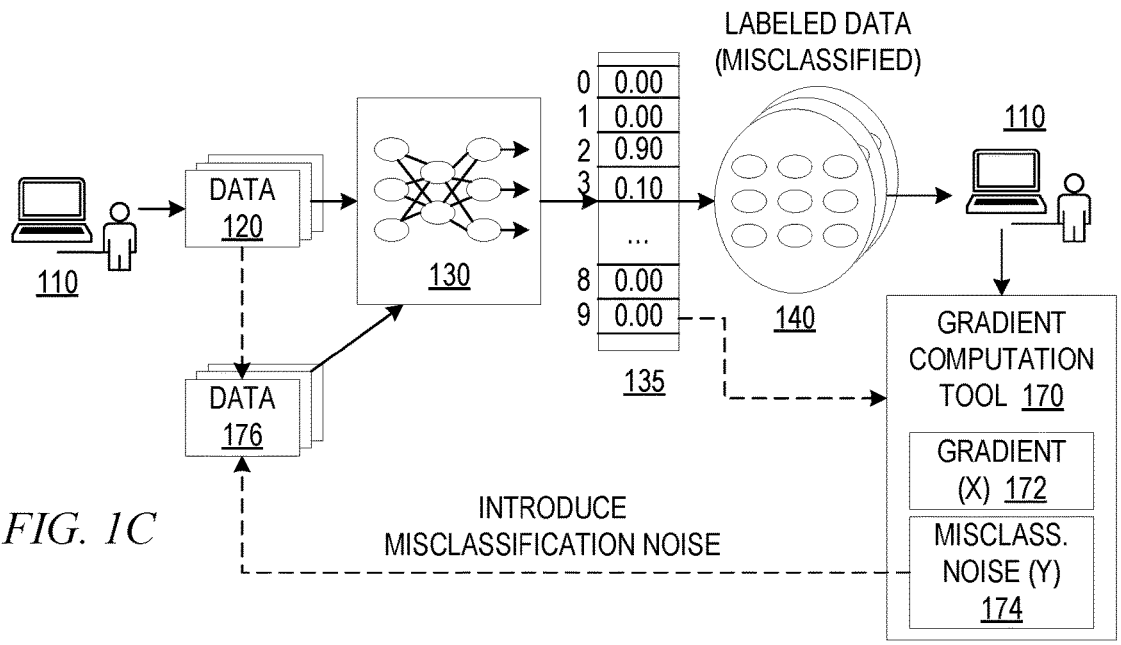
FIGS. 1C and 1D are block diagrams illustrating the problem of model evasion attacks and the solution of the perturbation insertion engine 160 provided by the mechanisms of the illustrative embodiments.
Figure 1D:
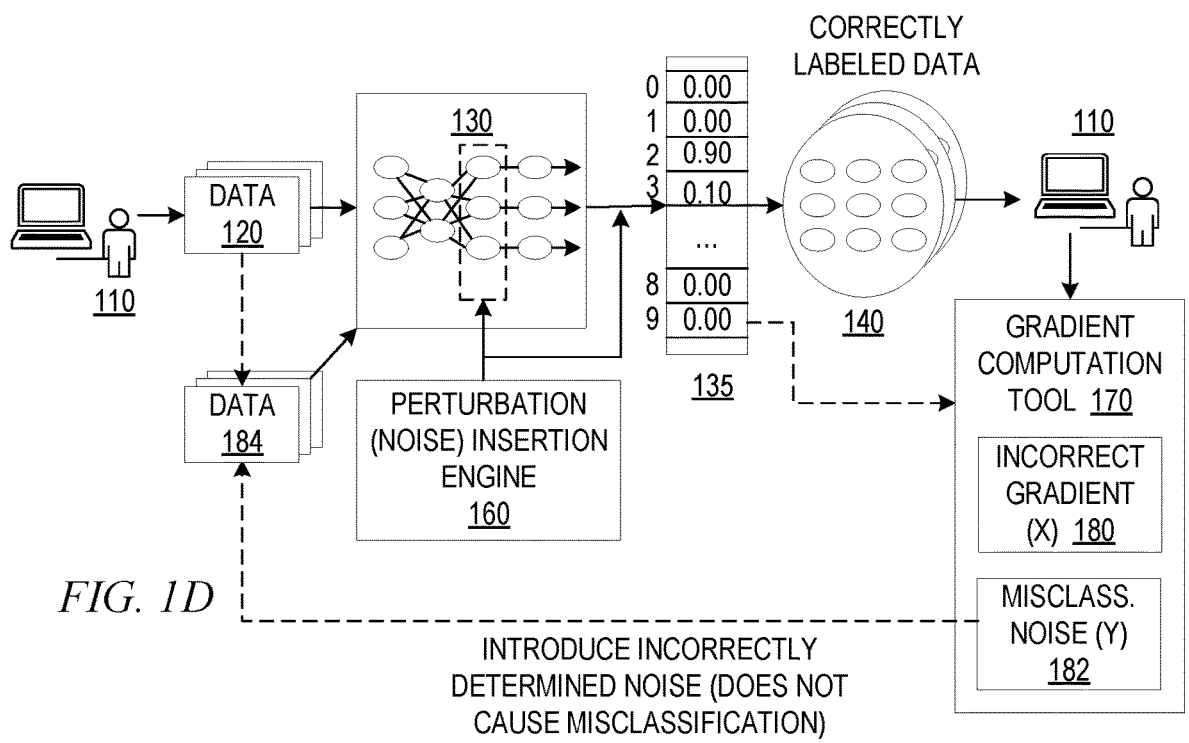

As noted above, the present invention provides mechanisms for protecting cognitive systems, such as those comprising neural networks and/or deep learning mechanisms, from attacks using gradients or their estimations such as model stealing or model evasion. FIGS. 1A-1D are block diagrams illustrating problems addressed by the present invention and the solution offered by the mechanisms of the illustrative embodiments. In the depictions of FIGS. 1A-1D it is assumed that the neural network model has been trained using training data, such as through a supervised or semi-supervised process using a ground truth data structure or the like, or any other known or later developed methodology for training a neural network model. FIGS. 1A and 1B depict block diagrams illustrating the problem of model stealing attacks and the solution of the perturbation insertion engine 160 provided by the mechanisms of the illustrative embodiments. FIGS. 1C and 1D depict block diagrams illustrating the problem of model evasion attacks and the solution of the perturbation insertion engine 160 provided by the mechanisms of the illustrative embodiments.

The examples shown in FIGS. 1A-1D assume that the neural network model is being used to perform a classification operation on an image of a number to thereby classify the image of the number as a number from "0" to "9". This is used only as an example of one possible simple classification operation that the neural network model may be used to perform and is not to be considered limiting on the applications of a neural network model with which the mechanisms of the illustrative embodiments may be implemented. As noted above, the mechanisms of the illustrative embodiments may be utilized with the outputs of any neural network models, machine learning models, or the like, regardless of the particular artificial intelligence operations performed by the neural network models, machine learning models, or the like. Moreover, although not shown explicitly in FIGS. 1A-1D, the neural network model, machine learning model, deep learning model, or the like, may be part of a more complex cognitive system that implements such a model to perform a complex cognitive operation, such as natural language processing, image analysis, patient treatment recommendation, medical imaging analysis, or any of a plethora of other cognitive operations, as described hereafter.

As shown in FIG. 1A, for a model stealing attacks, an attacker 110 may submit one or more sets of input data 120 to a trained neural network model 130 to obtain a labeled data set 140 that is output as result data to the attacker 110. Again, it should be appreciated that the term "data set" as used herein refers to a set of data that may comprise one or a plurality of data samples. In the case that a data set comprises more than one data sample, these data samples may be input to the trained neural network model 130 as a batch.

This process may be repeated for a plurality of sets of input data 120 to generate a plurality of labeled data sets 140 (which may also comprise labels for one or more data samples). A labeled data set 140 is a set of output data generated by the trained neural network model 130 where the unlabeled input data is augmented with additional tags or labels of meaningful information for the particular cognitive operation for which the data is to be used. For example, in a patient treatment recommendation cognitive system, the labeled data may comprise labels, tags, or annotations that specify various medical concepts with which the data is associated, e.g., a disease, a treatment, a patient's age, a patient's gender, etc. In the depicted example, the operation of the neural network model 130 is to classify a portion of an input image specified in a set of input data 120 into one of 10 categories representing numerical values that the portion of the input image represents, e.g., classes "0" to "9". Thus, the label that is affixed to a set of input data 120 may be a label of "0" or "1" or "2", etc.

The attacker 110, having obtained a plurality of labeled data sets 140 based on a plurality of input data sets 120 may utilize this correspondence of inputs/outputs to train their own model 150 to replicate the trained neural network model 130. Once the attacker 110 has their own replicated version 150 of the trained neural network model 130, they no longer need to utilize the original trained neural network model 130 to obtain the labeled data set 140 for future input data sets 120 and can utilize their own replicated model 150. This causes the provider of the original trained neural network model 130 to lose revenue from fees that may be charged for the use of original trained neural network model 130. In addition, this may give rise to competitors to the service provider that surreptitiously obtain the benefit of the resource investment of the service provider with regard to training the neural network model 130, without actually having to make such a resource investment.

As shown in FIG. 1A, the trained neural network 130 performs a classification operation for classifying the input data set 120. The output of the classification operation is a vector 135 of probability values where each slot of the vector output 135 represents a separate possible classification of the input data set 120. The training of a neural network, machine learning, deep learning, or other artificial intelligence model is generally known in the art and it is assumed that any such methodology may be used to perform such training. The training generally involves modifying weighting values associated with various features scored by nodes of the model based on training data sets to cause the model to output a correct vector output 135 labeling the input data set 120 correctly based on supervised or semi-supervised feedback. The neural network model 130 processes the input data set 120 through the various levels of nodes in the neural network model 130 to generate at the output nodes probability values corresponding to the particular class or label that the output node represents, i.e. the output node's value indicates the probability that the class or label of the corresponding vector slot applies to the input data set 120.

In this depicted example, each slot of the vector output 135 corresponds to a possible classification from "0" to "9" indicating the possible numerical values that the portion of the input image may represent. The probability values may range from 0% (e.g., 0.0) to 100% (e.g., 1.0) and may have various levels of precision based on the particular implementation desired. Thus, if a label or classification of "1" has a probability value of 1.0 this indicates absolute confidence that the input data set 120 represents the numerical value of "1" and a probability of value of 0.0 indicates that the input data set 120 does not represent the corresponding value, i.e. the label of that vector slot does not apply to the input data set 120.

While this is a simple example used for illustrative purposes, it should be appreciated that the number of classifications and corresponding labels, as well as the corresponding vector output 135, may be quite complex. As another example, these classifications may be, for example, in a medical imaging application where internal structures of human anatomy are being classified in a patient's chest, e.g., an aorta, a heart valve, a left ventricle, right ventricle, lungs, etc. It should be appreciated that the vector output 135 may comprise any number of potential vector slots, or classifications, at various levels of granularity depending on the particular application and implementation, and the vector output 135 may be of various sizes correspondingly.

A highest probability value vector slot (or simply "slot") in the vector output 135 may be selected to label the corresponding input data set 120. Thus, for example, assuming that the trained neural network model 130 is properly trained, an input data set 120 having an image of a numerical value of "2" will have an output vector 135 similar to that shown in FIG. 1A where the slot of the output vector 135 has a corresponding probability value that is a highest probability value of those in all of the slots of the vector output 135, e.g., "0.9" in this example. Thus, the labeled data output 140 would include a labeled data set that has a label of "2" associated with the input data set 120 showing the portion of an image corresponding to the numerical value "2."

FIG. 1B provides a block diagram illustrating an overview of the mechanism of one illustrative embodiment used to avoid model stealing attacks. The diagram shown in FIG. 1B is similar to that of FIG. 1A except that a perturbation insertion engine 160 is provided in association with, or as part of, the trained neural network model 130. For example, in embodiments where the perturbation insertion engine 160 is provided as part of the model 130 itself, the perturbation insertion engine 160 may operate as an additional layer of the model 130 just prior to the output layer of the model to thereby introduce perturbations in the probability values generated at the layer of the trained neural network model 130 just prior to the output layer of the model 130. In embodiments where the perturbation insertion engine 160 is external to the model 130, the perturbations may be injected into the output vector 135 of the trained neural network model 130 to thereby modify the original vector output 135 that is generated by the trained neural network model 130 to be a modified vector output 165 prior to generating the labeled data set 140 that is output to the attacker 110.

As shown in FIG. 1B, the modified vector output 165 provides a modified set of probability values associated with different labels or classes corresponding to vector slots. These modified probability values are generated by the introduction of the perturbations, or noise, into the probability values calculated from the trained neural network model 130. Thus, in this example, rather than the correct classification of "2" having a probability value of "0.9" indicating overwhelmingly that the label "2" is the correct label, the vector output 165 indicates that the probability value is "0.6" with the label "3" now having a probability value of "0.4". While the result is still the same label of "2" being applied to the input data set, the probability values are different than the trained neural network would normally generate. Thus, if the attacker 110 were to utilize the modified probability values of the modified vector output 165 to train their own neural network model, the resulting training would not replicate the trained neural network model 130 as incorrect probability values would be utilized.

The introduction of the perturbations, or noise, into the output of the trained neural network model 130 results in a modified or manipulated labeled data set 170 that is provided to the attacker 110 rather than the actual labeled data set 140 that would otherwise have been generated by the operation of the trained neural network model 130. If the attacker uses the manipulated labeled data set 170 to train the attackers own neural network model 150, the result will be an ill-replicated model with lower performance.

As mentioned previously, in addition to protecting against model stealing attacks such as that described above with regard to FIGS. 1A-1B, the illustrative embodiments further provide protections against model evasion attacks, as depicted in FIGS. 1C-1D. As shown in FIG. 1C, in a model evasion attack, the attacker 110 attempts to compute the gradient 172 of the trained model 130 based on the outputs 135 using a gradient computation tool 170. Such gradient computations as part of model evasion attacks are generally known in the art. Based on the computed gradient 172, the attacker 110 determines a level of noise that can be introduced into the data 120 to cause the model 130 to misclassify the data 120 and generate incorrectly labeled data 140, i.e. misclassified data 140. Thus, noisy data 176 is generated by modifying the input data 120 with the introduction of misclassification noise 174 which causes the model 130 to misclassify the input data into a different class than it would otherwise be classified, e.g., instead of data 120 which represents an image of a stop sign being classified into a class of "stop sign", the noisy version of the input data 120, i.e. data 176, will cause the input data 120 to be misclassified into a different class, e.g., "speed limit sign". The amount of noise introduced is such that the model 130 misclassifies the input data 120 but is not significant enough to cause the attack to be detected.

As shown in FIG. 1D, the perturbation insertion engine 160 operates in a similar manner as previously described above but so as to modify the gradient such that the gradient computation tool 170 of the attacker is not able to correctly identify the gradient of the model 130. Thus, instead of the gradient computation tool 170 generating the correct gradient 172, an incorrect gradient 180 is determined based on the outputs 135 which are generated based on the perturbations introduced into the gradient of the model 130. Hence, an incorrect misclassification noise 183 will be generated by the attacker 110 which will not cause misclassification by the model 130. That is, the noisy data 184, while having misclassification noise 182 introduced into it, will still not be significant enough to cause the model 130 to incorrectly classify the data 120. Thus, the model 130 will still output correct labeled (classified) data 140.

Figure 2A:
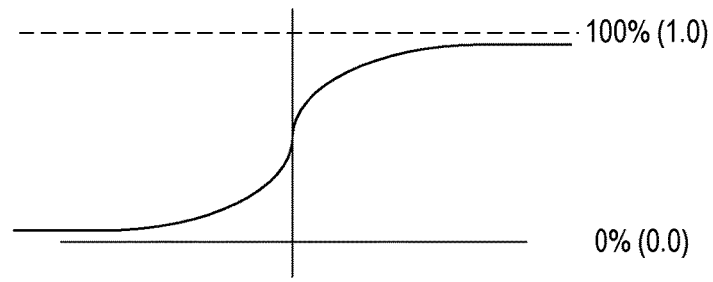
FIG. 2A illustrates the sigmoid function or the softmax function that is typically used with neural network models.
Figure 2B:
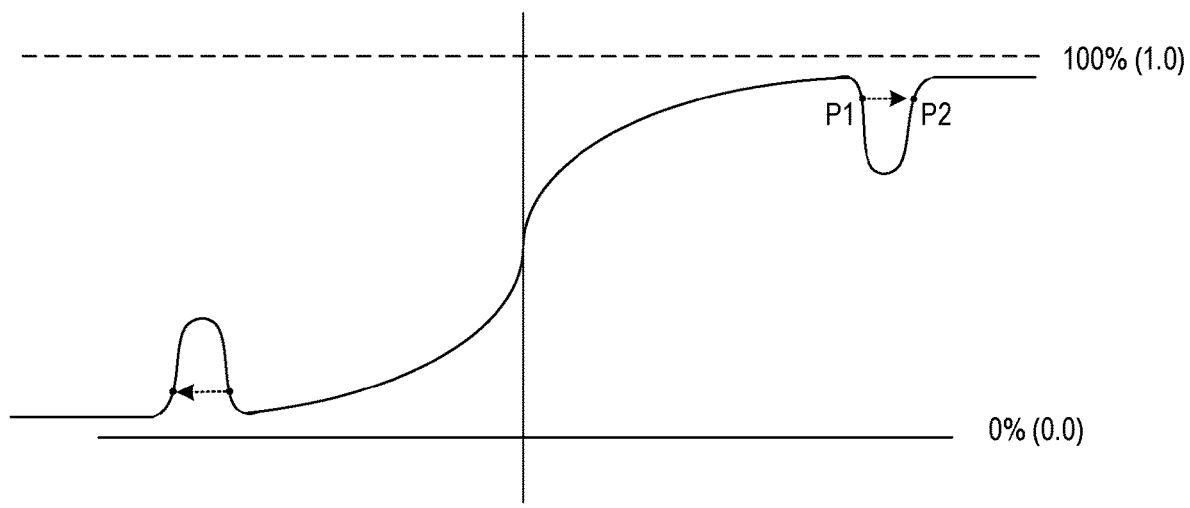
FIG. 2B illustrates the sigmoid function or the softmax function in which perturbations, or noise, are introduced into the curve such that the correct gradient of the curve is not able to be identified by an attacker, in accordance with one illustrative embodiment.

To illustrate the way in which the introduction of perturbations or noise into the output generated by the trained neural network model operates to obfuscate the training of the neural network model, consider the example diagrams in FIGS. 2A and 2B. FIG. 2A illustrates the sigmoid function that is typically used with neural network models. As shown in FIG. 2A, probability values follow the sigmoid function curve in a predictable manner. That is, as a data sample of the input data set is processed through multiple layers of the neural network model, the data sample's features (e.g., shapes or layouts of black pixels) are aggregated to produce a "score". This score is highly relevant to the output probability, but is not normalized. In some illustrative embodiments, the score is a probability that ranges from 0.0 to 1.0, but this score can be an arbitrary value. The sigmoid or softmax function is a function to normalize such a score into a [0,1] boundary. The sigmoid function looks at a single score (e.g., label "2" score is 100, then the probability becomes 0.9), and softmax considers multiple competing scores, e.g., label "2" score is 100, and label "3" score is 300) in which case the label "2" probability is 0.2, and the label "3" probability is 0.8. The sigmoid function is only used in binary classification where there only two distinct classes. The softmax function is a generalization of the sigmoid function to more classes and thus, it shares many similarities to sigmoid.

The sigmoid or softmax function can be considered to be stretched or shrunk depending on the training of the neural network model by updating the model weights, but is predictable to an attacker 110 given a labeled data set 140, for example, through curve fitting or the like, i.e. the attacker attempts to learn the same curve used by the trained neural network model 130 based on the collection of input data sets 120 and corresponding output labeled data 140 obtained from the trained neural network model 130. Typically, such learning of the curve requires the calculation of a gradient (e.g., change in y coordinate divided by change in x coordinate of a graphed curve) from points along the curve to know the direction and magnitude of the curvature of the curve.

With reference now to FIG. 2B, in accordance with the mechanisms of the illustrative embodiments, perturbations, or noise, are introduced into the curve such that the correct gradient of the curve is not able to be identified by the attacker 110. As shown in FIG. 2B, at portions of the curve where perturbations are introduced, the attacker 110 is fooled by the perturbation in identifying an incorrect location of the point along the curve, e.g., the attacker 110 can be fooled into identifying the location P1 as being at location P2 due to the perturbation 200 introduced into the curve, as the attacker relies on the probability score (y-axis) to find the location. That is, without perturbation, the attacker can infer the correct position (x-axis value) given the probability (y-axis value). However, with this perturbation, there are more than one position with the given probability. As a result, the attacker cannot precisely determine to which position to fit the replicated curve. Moreover, depending on the type of perturbation, as shown in FIG. 2B, the gradients computed by the attacker to train a replicated model (model stealing attack), or to determine misclassification noise to introduce (evasion attack), can be the opposite direction of the genuine one, which can revert at least a part of the training and replication process.

Because of the nature of the softmax or sigmoid function curve, there is more area of the curve into which perturbations or noise may be added at the ends of the curve. Thus, the mechanisms of some illustrative embodiments utilize perturbation injection logic that introduce such perturbations in the ends of the curve near 0.0 and 1.0, i.e. very low and very high probability value areas as previously mentioned above, so as to make an attacker's attempt to utilize the output of the trained neural network model 130 to train their own neural network model result in a lower performance model. The introduction of the perturbations or noise at the ends of the curve can be facilitated by subtracting a sigmoid function or hyperbolic tangent function that has a higher absolute value in the ends of the curve, like 0.5(sigma(0.25h(x))−0.5)) in perturbation 1 mentioned above.

Thus, the illustrative embodiments provide mechanisms for obfuscating a trained configuration of a neural network, machine learning, deep learning, of other artificial intelligence/cognitive model by introducing noise into the output of such trained models in such a way as to maintain the accuracy of the output, yet manipulate the output values to make detection of the specific curve or function to which the model correlates difficult to reproduce. The introduction of the perturbations, or noise, is done so as to minimize the change in boundary cases but introduce large size perturbations in areas of the curve or function where the probability values are relatively high/low, e.g., near 1.0 and near 0.0 in the case of a sigmoid/softmax function. While such perturbations are introduced into these areas of the function or curve, the perturbations are sized such that that output classes do not change in the modified output because the perturbation modifications are limited to less than predetermined amount of change that will not modify the output classifications.

Figure 3:
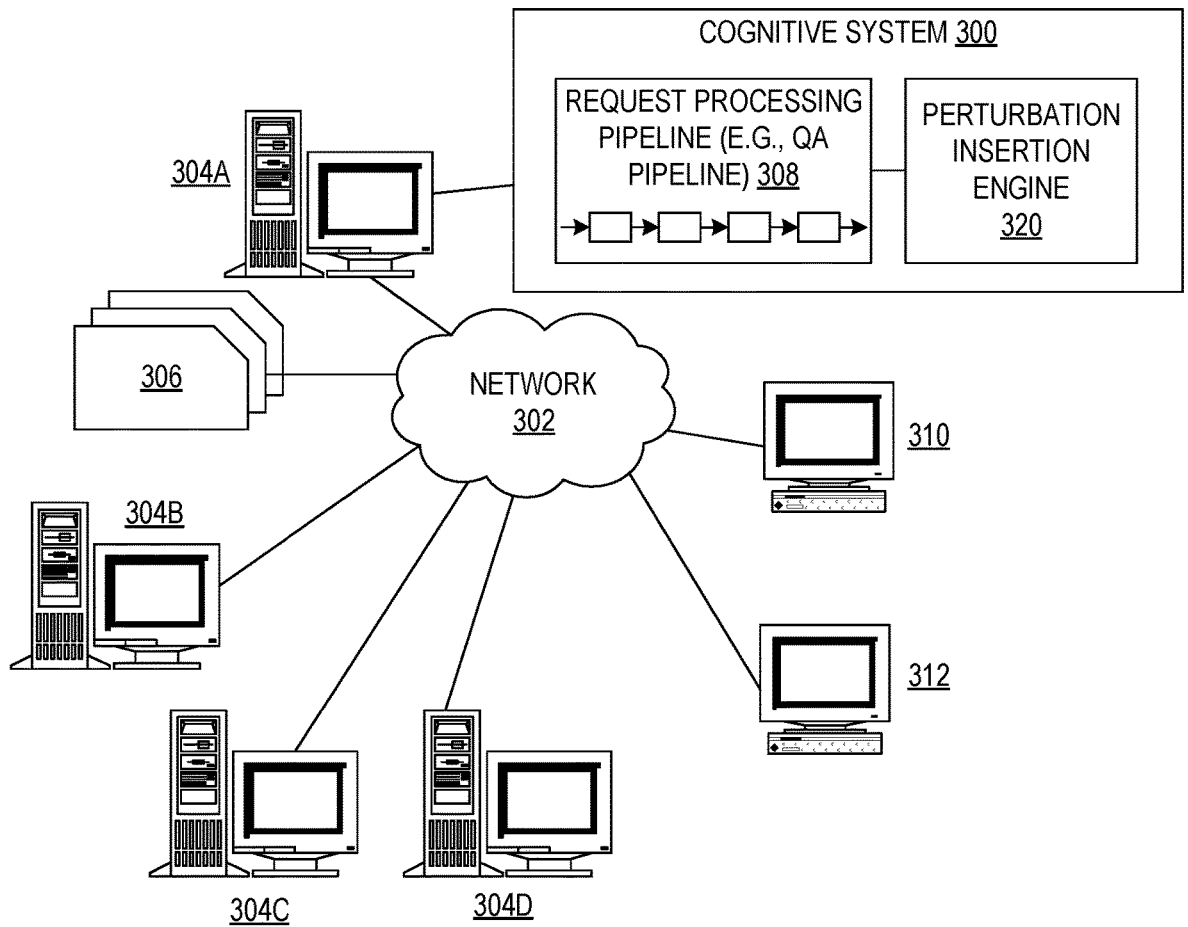
FIG. 3 depicts a schematic diagram of one illustrative embodiment of a cognitive system in a computer network.
Figure 4:
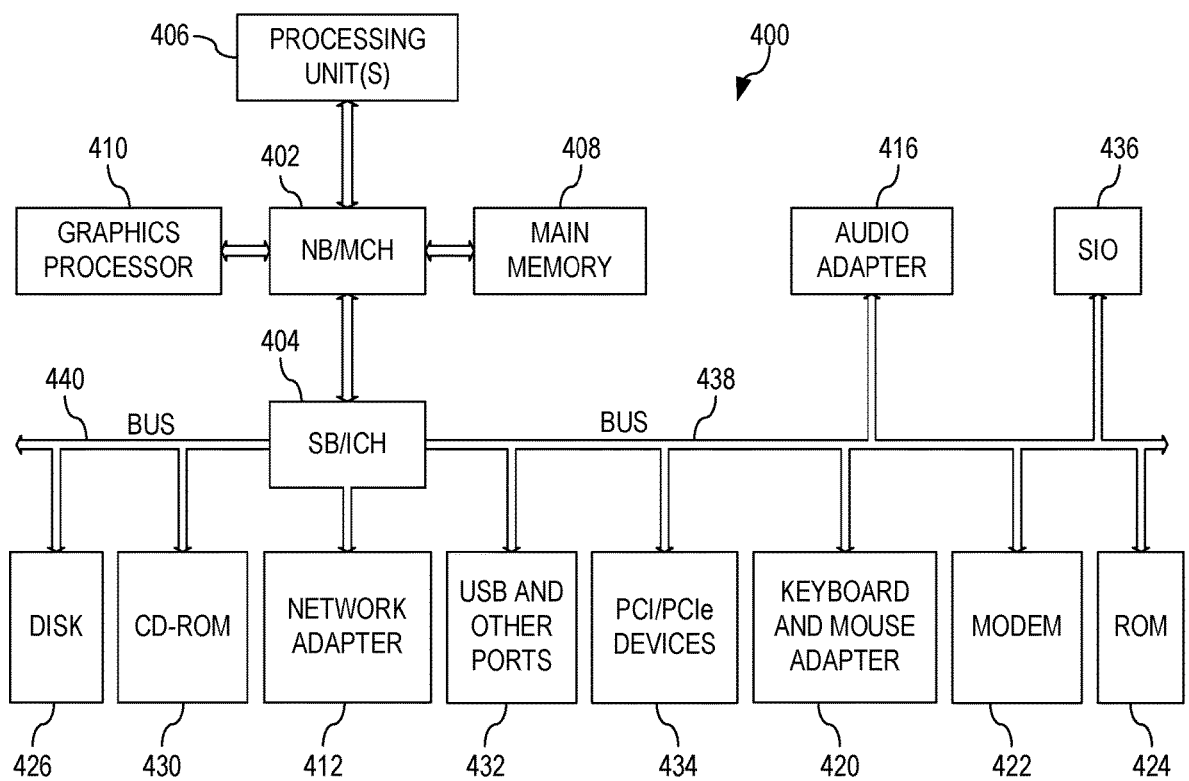
FIG. 4 is a block diagram of an example data processing system in which aspects of the illustrative embodiments are implemented.
Figure 5:
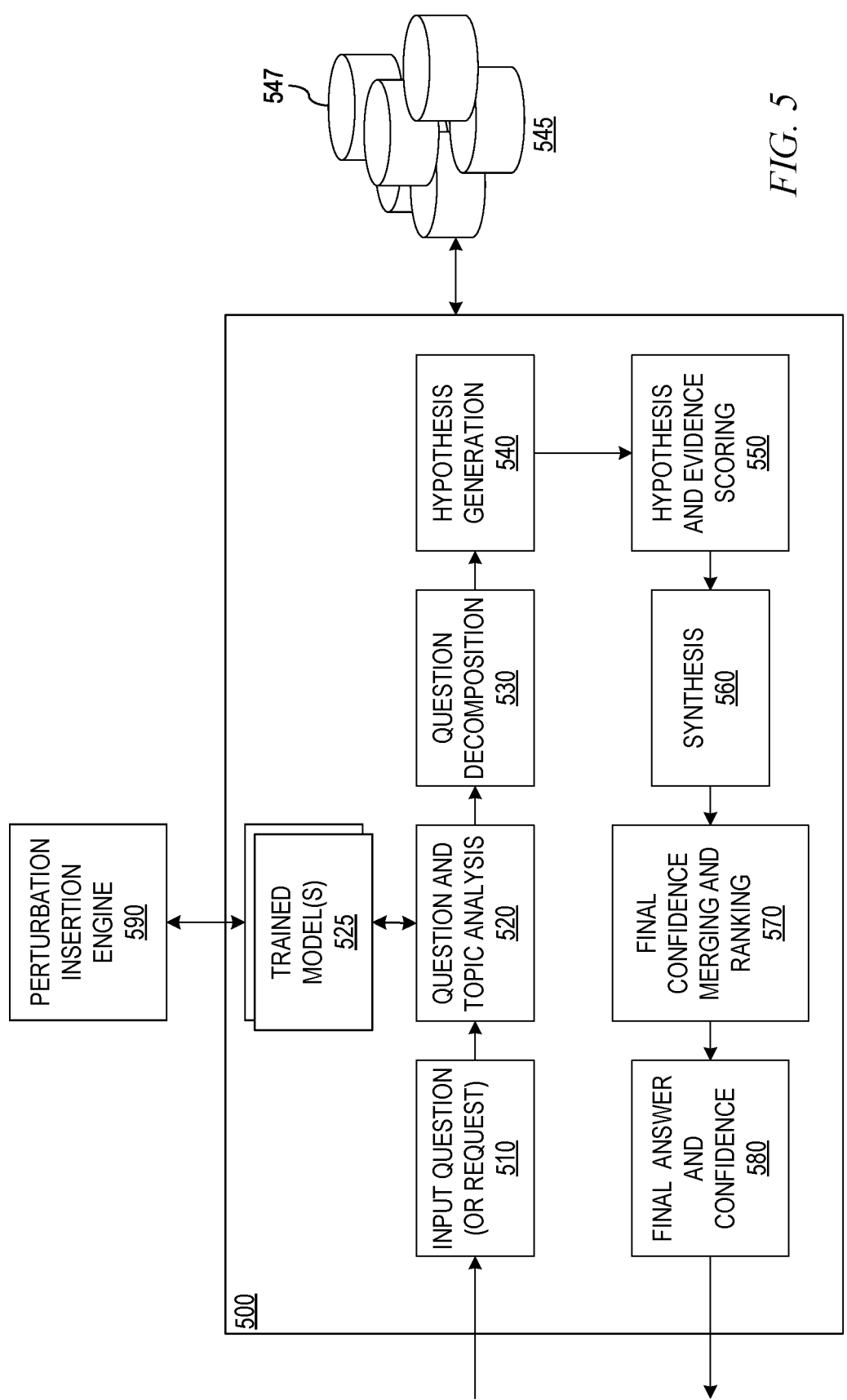
FIG. 5 illustrates a cognitive system processing pipeline for processing a natural language input to generate a response or result in accordance with one illustrative embodiment.

As noted above, the mechanisms of the illustrative embodiments are directed to protecting trained neural network models, machine learning models, deep learning models, and the like, implemented in specialized logic of specially configured computing devices, data processing systems, or the like, of a technological environment. As such, the illustrative embodiments may be utilized in many different types of data processing environments. In order to provide a context for the description of the specific elements and functionality of the illustrative embodiments, FIGS. 3-5 are provided hereafter as example environments in which aspects of the illustrative embodiments may be implemented. It should be appreciated that FIGS. 3-5 are only examples and are not intended to assert or imply any limitation with regard to the environments in which aspects or embodiments of the present invention may be implemented. Many modifications to the depicted environments may be made without departing from the spirit and scope of the present invention.

FIGS. 3-5 are directed to describing an example cognitive system which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structured or unstructured request messages, natural language questions, or any other suitable format for requesting an operation to be performed by the cognitive system. In some illustrative embodiments, the requests may be in the form of input data sets that are to be classified in accordance with a cognitive classification operation performed by a machine learning, neural network, deep learning, or other artificial intelligence based model that is implemented by the cognitive system. The input data sets may represent various types of input data depending upon the particular implementation, such as audio input data, image input data, textual input data, or the like. For example, in one possible implementation, the input data set may represent a medical image, such as an x-ray image, CT scan image, MRI image, or the like, that is to have portions of the image, or the image as a whole, classified into one or more predefined classifications.

It should be appreciated that classification of input data may result in a labeled set of data that has labels or annotations representing the corresponding classes into which the non-labeled input data set is classified. This may be an intermediate step in performing other cognitive operations by the cognitive system that support decision making by human users, e.g., the cognitive system may be a decision support system. For example, in a medical domain, the cognitive system may operate to perform medical image analysis to identify anomalies for identification to a clinician, patient diagnosis and/or treatment recommendation, drug interaction analysis, or any of a plethora of other possible decision support operations.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a medical image analysis, while a second request processing pipeline may be configured and trained to operate on input requests concerning patient electronic medical record (EMR) analysis involving natural language processing. In other cases, for example, the request processing pipelines may be configured to provide different types of cognitive functions or support different types of applications, such as one request processing pipeline being used for patient treatment recommendation generation, while another pipeline may be trained for financial industry based forecasting, etc.

Moreover, each request processing pipeline may have their own associated corpus or corpora that they ingest and operate on, e.g., one corpus for medical treatment documents and another corpus for financial industry domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms to protect the models implemented in these pipelines, or by the cognitive system as a whole, from model stealing attacks. In particular, in portions of the cognitive system in which the trained neural network models, machine learning models, deep learning models, or the like, are employed to generate labeled data set outputs, the mechanisms of the illustrative embodiments may be implemented to modify the labeled data set outputs by the introduction of noise into the probability values generated by the trained models and thereby obfuscate the training of the models.

As the mechanisms of the illustrative embodiments may be part of a cognitive system and may improve the operation of the cognitive system by protecting it from model stealing attacks, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 3-5 are only examples and are not intended to state or imply any limitation with regard to the type of cognitive system mechanisms with which the illustrative embodiments are implemented. Many modifications to the example cognitive system shown in FIGS. 3-5 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. This logic may implement one or more models, such as a neural network model, a machine learning model, a deep learning model, that may be trained for particular purposes for supporting the particular cognitive operations performed by the cognitive system. In accordance with the mechanisms of the illustrative embodiments, the logic further implements the perturbation insertion engine mechanisms described above, and hereafter, for introducing perturbations, or noise, into the outputs of the implemented models so as to obfuscate the training of the models to those who would attempt to perform model stealing attacks.

The logic of the cognitive system implements the cognitive computing operation(s), examples of which include, but are not limited to, question answering, identification of related concepts within different portions of content in a corpus, intelligent search algorithms, such as Internet web page searches, for example, medical diagnostic and treatment recommendations, other types of recommendation generation, e.g., items of interest to a particular user, potential new contact recommendations, etc., image analysis, audio analysis, and the like. The types and number of cognitive operations that may be implemented using the cognitive system of the illustrative embodiments are vast and cannot all be documented herein. Any cognitive computing operation emulating decision making and analysis performed by human beings, but in an artificial intelligence or cognitive computing manner, is intended to be within the spirit and scope of the present invention.

IBM Watson™ is an example of one such cognitive computing system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive computing systems (or simply "cognitive systems") provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 3 depicts a schematic diagram of one illustrative embodiment of a cognitive system 300 implementing a request processing pipeline 308, which in some embodiments may be a question answering (QA) pipeline, in a computer network 302. For purposes of the present description, it will be assumed that the request processing pipeline 308 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 300 is implemented on one or more computing devices 304A-D (comprising one or more processors and one or more memories, and potentially any other computing device elements generally known in the art including buses, storage devices, communication interfaces, and the like) connected to the computer network 302. For purposes of illustration only, FIG. 3 depicts the cognitive system 300 being implemented on computing device 304A only, but as noted above the cognitive system 300 may be distributed across multiple computing devices, such as a plurality of computing devices 304A-D. The network 302 includes multiple computing devices 304A-D, which may operate as server computing devices, and 310-312 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 300 and network 302 enables question processing and answer generation (QA) functionality for one or more cognitive system users via their respective computing devices 310-312. In other embodiments, the cognitive system 300 and network 302 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 300 may be used with components, systems, subsystems, and/or devices other than those that are depicted herein.

The cognitive system 300 is configured to implement a request processing pipeline 308 that receive inputs from various sources. The requests may be posed in the form of a natural language question, natural language request for information, natural language request for the performance of a cognitive operation, or the like. For example, the cognitive system 300 receives input from the network 302, a corpus or corpora of electronic documents 306, cognitive system users, and/or other data and other possible sources of input. In one embodiment, some or all of the inputs to the cognitive system 300 are routed through the network 302. The various computing devices 304A-D on the network 302 include access points for content creators and cognitive system users. Some of the computing devices 304A-D include devices for a database storing the corpus or corpora of data 306 (which is shown as a separate entity in FIG. 3 for illustrative purposes only). Portions of the corpus or corpora of data 306 may also be provided on one or more other network attached storage devices, in one or more databases, or other computing devices not explicitly shown in FIG. 3. The network 302 includes local network connections and remote connections in various embodiments, such that the cognitive system 300 may operate in environments of any size, including local and global, e.g., the Internet.

In one embodiment, the content creator creates content in a document of the corpus or corpora of data 306 for use as part of a corpus of data with the cognitive system 300. The document includes any file, text, article, or source of data for use in the cognitive system 300. Cognitive system users access the cognitive system 300 via a network connection or an Internet connection to the network 302, and input questions/requests to the cognitive system 300 that are answered/processed based on the content in the corpus or corpora of data 306. In one embodiment, the questions/requests are formed using natural language. The cognitive system 300 parses and interprets the question/request via a pipeline 308, and provides a response to the cognitive system user, e.g., cognitive system user 310, containing one or more answers to the question posed, response to the request, results of processing the request, or the like. In some embodiments, the cognitive system 300 provides a response to users in a ranked list of candidate answers/responses while in other illustrative embodiments, the cognitive system 300 provides a single final answer/response or a combination of a final answer/response and ranked listing of other candidate answers/responses.

The cognitive system 300 implements the pipeline 308 which comprises a plurality of stages for processing an input question/request based on information obtained from the corpus or corpora of data 306. The pipeline 308 generates answers/responses for the input question or request based on the processing of the input question/request and the corpus or corpora of data 306. The pipeline 308 will be described in greater detail hereafter with regard to FIG. 5.

In some illustrative embodiments, the cognitive system 300 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 306. Based on the application of the queries to the corpus or corpora of data 306, a set of hypotheses, or candidate answers/responses to the input question/request, are generated by looking across the corpus or corpora of data 306 for portions of the corpus or corpora of data 306 (hereafter referred to simply as the corpus 306) that have some potential for containing a valuable response to the input question/response (hereafter assumed to be an input question). The pipeline 308 of the IBM Watson™ cognitive system then performs deep analysis on the language of the input question and the language used in each of the portions of the corpus 306 found during the application of the queries using a variety of reasoning algorithms.

The scores obtained from the various reasoning algorithms are then weighted against a statistical model that summarizes a level of confidence that the pipeline 308 of the IBM Watson™ cognitive system 300, in this example, has regarding the evidence that the potential candidate answer is inferred by the question. This process is be repeated for each of the candidate answers to generate ranked listing of candidate answers which may then be presented to the user that submitted the input question, e.g., a user of client computing device 310, or from which a final answer is selected and presented to the user. More information about the pipeline 308 of the IBM Watson™ cognitive system 300 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 300 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis.

Regardless of the manner by which the question or request is input to the cognitive system 300, the processing of the request or question involves the application of a trained model, e.g., neural network model, machine learning model, deep learning model, etc., to an input data set as described previously above. This input data set may represent features of the actual request or question itself, data submitted along with the request or question upon which processing is to be performed, or the like. The application of the trained model to an input data set may occur at various points during the performance of the cognitive computing operations by the cognitive system. For example, the trained model may be utilized during feature extraction and classification by a feature extraction stage of processing of the request or input question, e.g., taking a natural language term in the request or question and classifying it as one of a plurality of possible concepts that the term corresponds to, e.g., classifying the term "truck" in an input question or request into a plurality of possible classes, one of which may be "vehicle". As another example, a portion of an image comprising a plurality of pixel data may have the trained model applied to it to determine what the object is that is in the portion of the image. The mechanisms of the illustrative embodiments operate on the output of the trained model as discussed previously above, which may be an intermediate operation within the overall cognitive system's cognitive computing operations, e.g., classification of a portion of a medical image into one of a plurality of different anatomical structures may be an intermediate operation to performing an anomaly identification and treatment recommendation cognitive computing operation.

As shown in FIG. 3, the cognitive system 300 is further augmented, in accordance with the mechanisms of the illustrative embodiments, to include logic implemented in specialized hardware, software executed on hardware, or any combination of specialized hardware and software executed on hardware, for implementing a perturbation insertion engine 320. The perturbation insertion engine 320 may be provided as an external engine to the logic implementing the trained model 360 of the cognitive system 300 or may be integrated into the trained model logic 360, such as in a layer of the model prior to the output of a vector output of probability values representing the classification of the input data and its corresponding labels. The perturbation insertion engine 320 operates to insert perturbations into the output probabilities generated by the trained model logic 360 such that gradients calculated for points along a curve represented by the output probabilities deviate from a correct direction and amount and also minimize accuracy loss in the modified output classifications and corresponding labels.

In one illustrative embodiment, the perturbation insertion engine 320 meets these criteria by using a perturbation function that reverses the sign of the first order derivative of the output probability curve, e.g., the sigmoid or softmax curve of the probability values, and adds noise or perturbations at the ends of the curve, near the maximum and minimum values of the curve, up to +/− half the range from the minimum value to the maximum value, e.g., in the case of a softmax or sigmoid probability value curve that ranges from 0% to 100%, the noise or perturbations have a magnitude of up to +/−0.5. As mentioned previously above, the particular perturbation function utilized may take many different forms including those previously listed above and others that meet the criteria and guidelines mentioned above.

The resulting modified output vector provides modified probability values while maintaining the correctness of the classification and associated labels that are associated with the input data in a labeled data set. Thus, correct classification and labeling of the input data set is still performed while obfuscating the actual trained configuration of the trained model logic 360. The resulting classified or labeled data set may be provided to further stages of processing downstream in the pipeline 306 for further processing and performance of the overall cognitive operation for which the cognitive system 300 is employed.

Thus, an attacker, such as a user of client computing device 310 or the like, is not able to submit a plurality of input data sets, obtain corresponding labeled output data sets and corresponding probability values of output vectors, and thereby train their own trained models to accurately replicate the training of the trained model logic 360 by utilizing the labeled data set and its associated probability values in the vector output as training data. To the contrary, doing so would result in a model that provides significantly lower performance than that of the trained model logic 360 resulting in a need to continue to utilize the trained model logic 360. In the case where a service provider charges a fee for utilization of the cognitive system 300 and/or trained model logic 360, this will result in a continued revenue stream for the service provider. Moreover, an attacker is not able to determine the gradient of the trained model logic 360 so as to determine misclassification noise that can cause the trained model logic 360 to misclassify an input data set, i.e. cannot successfully perform a model evasion attack. Thus, for example, the attacker cannot circumvent security systems using such trained model logic 360 by causing the model to classify an image as an authorized user image when in face the image is not associated with an authorized user. Moreover, as another example, the attacker cannot cause the system to operate incorrectly based on a misclassified input data, e.g., an automated vehicle braking system not being activated because an onboard image system misclassifies a stop sign as a speed limit sign.

It should be appreciated that while FIG. 3 illustrates the implementation of the trained model logic 360 as part of a cognitive system 300, the illustrative embodiments are not limited to such. Rather, in some illustrative embodiments, the trained model logic 360 itself may be provided as a service from which a user of a client computing device 310, may request processing of an input data set. Moreover, other providers of services, which may include other cognitive systems, may utilize such a trained model 360 to augment the operation of their own cognitive systems. Thus, in some illustrative embodiments the trained model logic 360 may be implemented in one or more server computing devices, accessed via one or more APIs via other computing devices through which input data sets are submitted to the trained model logic 360, and corresponding labeled data sets are returned. Thus, the integration of the mechanisms of the illustrative embodiments into a cognitive system 300 is not required, but may be performed depending on the desired implementation.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

FIG. 4 is a block diagram of an example data processing system in which aspects of the illustrative embodiments are implemented. Data processing system 400 is an example of a computer, such as server computing device 304 or client computing device 310 in FIG. 3, in which computer usable code or instructions implementing the processes for illustrative embodiments of the present invention are located. In one illustrative embodiment, FIG. 4 represents a server computing device, such as a server 304, which, which implements a cognitive system 300 and request or QA system pipeline 308 augmented to include the additional mechanisms of the illustrative embodiments described herein with regard to a perturbation insertion engine for protecting the trained neural network, machine learning, deep learning, or other artificial intelligence model logic from model stealing attacks.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 is connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 is connected to SB/ICH 404.

An operating system runs on processing unit 406. The operating system coordinates and provides control of various components within the data processing system 400 in FIG. 4. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM® eServer™ System p® computer system, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and are loaded into main memory 408 for execution by processing unit 406. The processes for illustrative embodiments of the present invention are performed by processing unit 406 using computer usable program code, which is located in a memory such as, for example, main memory 408, ROM 424, or in one or more peripheral devices 426 and 430, for example.

A bus system, such as bus 438 or bus 440 as shown in FIG. 4, is comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, includes one or more devices used to transmit and receive data. A memory may be, for example, main memory 408, ROM 424, or a cache such as found in NB/MCH 402 in FIG. 4.

Those of ordinary skill in the art will appreciate that the hardware depicted in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

FIG. 5 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 5 is provided only as one example of the processing structure that may be implemented to process a natural language input requesting the operation of a cognitive system to present a response or result to the natural language input.

The QA system pipeline of FIG. 5 may be implemented, for example, as QA pipeline 308 of cognitive system 300 in FIG. 3. It should be appreciated that the stages of the QA pipeline shown in FIG. 5 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 5 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 5, the QA pipeline 500 comprises a plurality of stages 510-580 through which the cognitive system operates to analyze an input question and generate a final response. In an initial question input stage 510, the QA pipeline 500 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 500, i.e. the question and topic analysis stage 520, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

The classification of the extracted features from the input question may be performed using one or more trained models 525 which may be implemented, for example, as neural network models, machine learning models, deep learning models, or other type of artificial intelligence based model. As noted above, the mechanisms of the illustrative embodiments may be implemented at the question and topic analysis stage 520 with regard to the classification of the extracted features of the input question by such trained models 525. That is, as the trained model 525 operates on the input data, e.g., the extracted features from the input question, to classify the input data, prior to output of the vector output, the perturbation insertion engine 590 of the illustrative embodiments may operate to introduce perturbations into the probability values generated in the output vector while maintaining the accuracy of the classification as discussed above. Thus, while correct classification is still provided downstream along the QA system pipeline 500, any attacker obtaining access to the output vector probability values for purposes of training their own model using a model stealing attack, would be presented with inaccurate probability values that result in any model trained on such probability values providing lower performance than the trained model 525.

It should be appreciated that the input data, in some illustrative embodiments, need not be a formulated request or question, either structure or unstructured, but instead may simply be an input data set that is input with the implied request that the input data set be processed by the pipeline 500. For example, in embodiments where the pipeline 500 is configured to perform image analysis cognitive operations, input images may be provided as input to the pipeline 500 which extracts major features of the input images, classifies them according to the trained model 525, and performs other processing of the pipeline 500 as described hereafter to score the hypotheses as to what is shown in the image, to thereby generate a final result output. In other cases, audio input data may also be analyzed in a similar manner. Regardless of the nature of the input data being processed, the mechanisms of the illustrative embodiments may be employed to insert perturbations in the probability values associated with the classification operations performed by the trained models 525 so as to obfuscate the training of the trained models.

Referring again to FIG. 5, the identified major features are then used during the question decomposition stage 530 to decompose the question into one or more queries that are applied to the corpora of data/information 545 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 545. That is, these various sources themselves, different collections of sources, and the like, represent a different corpus 547 within the corpora 545. There may be different corpora 547 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 547 within the corpora 545.

The queries are applied to one or more databases storing information about the electronic texts, documents, articles, websites, and the like, that make up the corpus of data/information, e.g., the corpus of data 306 in FIG. 3. The queries are applied to the corpus of data/information at the hypothesis generation stage 540 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA pipeline 500, in stage 550, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 560, the large number of scores generated by the various reasoning algorithms are synthesized into confidence scores or confidence measures for the various hypotheses. This process involves applying weights to the various scores, where the weights have been determined through training of the statistical model employed by the QA pipeline 500 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 500 that identifies a manner by which these scores may be combined to generate a confidence score or measure for the individual hypotheses or candidate answers. This confidence score or measure summarizes the level of confidence that the QA pipeline 500 has about the evidence that the candidate answer is inferred by the input question, i.e. that the candidate answer is the correct answer for the input question.

The resulting confidence scores or measures are processed by a final confidence merging and ranking stage 570 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, are generated and output to the submitter of the original input question via a graphical user interface or other mechanism for outputting information.

Thus, the illustrative embodiments provide mechanisms for protecting trained artificial intelligence or cognitive models, such as neural network model, from model stealing attacks. The illustrative embodiments introduce perturbations, or noise, in the probability values output by the trained models such that an attacker's calculation of gradients based on the output probability values is deviated from the correct direction and magnitude while minimizing loss in the accuracy of the trained model's classification or labeled data set. In some illustrative embodiments, this result is achieved by using a perturbation function that reverses the sign of the first order derivative of the sigmoid or softmax function of the trained model and adds noise or perturbations at the ends of the curve of the sigmoid or softmax function, near the minimum and maximum values of the curve. The result is that if an attacker uses the modified probability values output by the trained model as a basis for training their own model, the resulting attacker model will have less accuracy than the trained model it is attempting to replicate, or the attacker (in the case of an evasion attack) is unable to generate noise to introduce into the input data that will cause the input data to be misclassified by the trained model.

Figure 6:
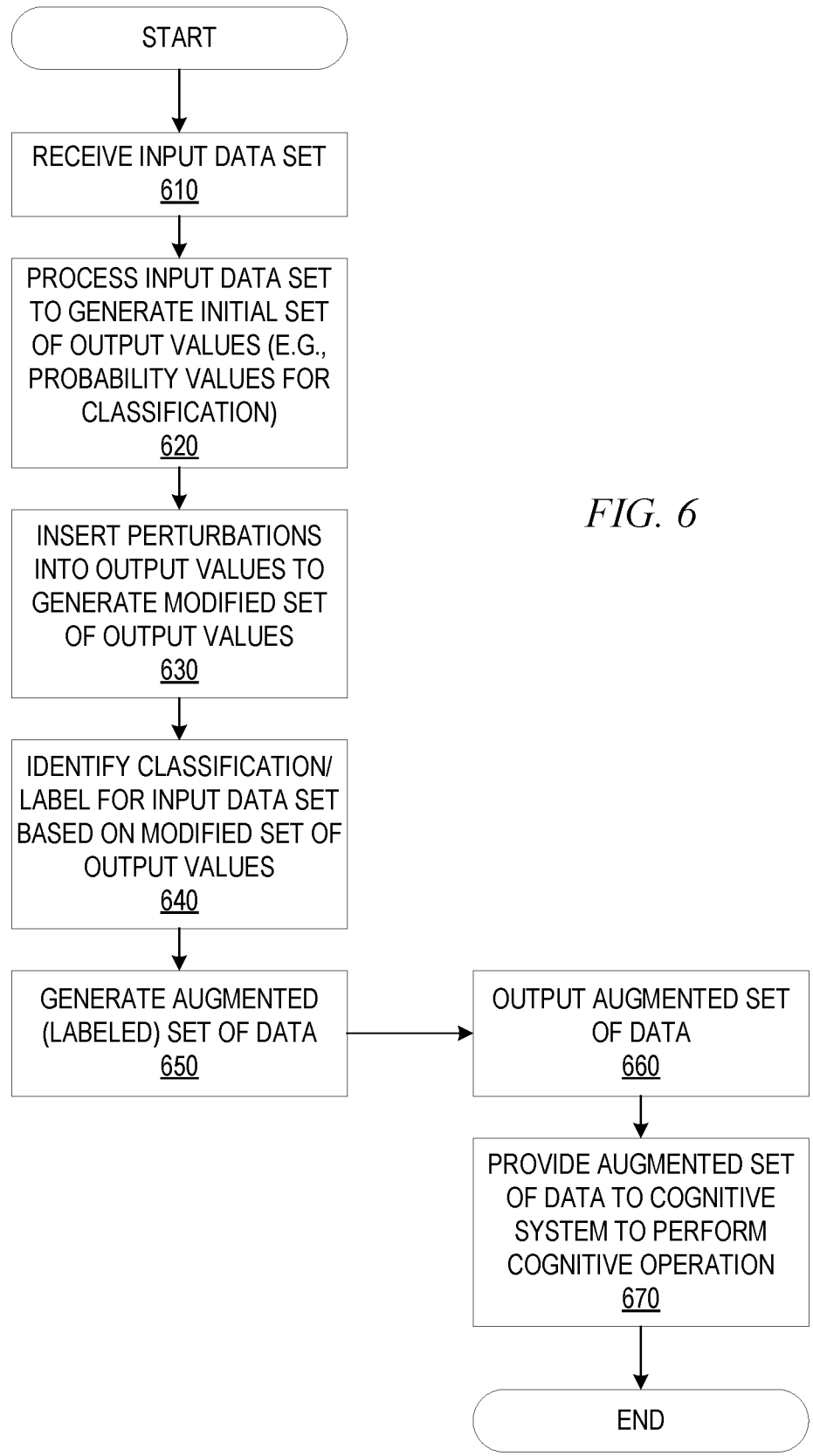
FIG. 6 is a flowchart outlining an example operation for obfuscating a trained configuration of a trained machine learning model in accordance with one illustrative embodiment.

FIG. 6 is a flowchart outlining an example operation for obfuscating the trained configuration of a trained model in the output vector of the trained model in accordance with one illustrative embodiment. As shown in FIG. 6, the operation starts by receiving an input data set (step 610). The input data set is processed by a trained model to generate an initial set of output values (step 620). Perturbations are inserted into the output values to modify the initial set of output values and generate a modified set of output values comprising introduced noise represented by the perturbations (step 630). The modified set of output values are used to identify a classification and/or label for the input data set (step 640). The modified set of output values are used to generate an augmented output set of data that is augmented to include labels corresponding to the classification identified by the modified set of output values (step 650). The augmented (labeled) data set, which may include the modified set of output values, is then output (step 660). Thereafter, the augmented (labeled) data set may be provided as input to a cognitive computing operation engine that processes the labeled data set to perform a cognitive operation (step 670). The operation then terminates.

It should be appreciated that while FIG. 6 includes steps 650-670 as part of the example operation, the operation in some illustrative embodiments, may end at step 640 and steps 650-670 need not be included. That is, rather than classification/labeling and cognitive computing operation, as is performed in steps 650-670, the modified output values (step 640) may be output for use either by a user or other computing system. Thus, the user and/or other computing system may operate on the modified output values themselves and may not utilize classifications/labels as provided in steps 650-670.

Thus, the illustrative embodiments described above add small deceptive perturbations to the output of the machine learning model, e.g., neural network, such that the loss surface changes to trap or deceive the attack with confusing gradients. In the above illustrative embodiments, the noise (perturbations) introduced into the output (probability values for classifications) of the trained model(s), e.g., neural networks, such as trained model(s) 525 in FIG. 5, by the perturbation insertion engine 320 in FIG. 3 or 590 in FIG. 5 to modify the initial set of output values, and generate a modified set of output values, affects all of the classifications of the output. This may lead to a significant amount of noise being introduced into the model and hence may dilute the meaning of the returned probabilities. For example, suppose the original probability vector (output) is [1.0, 0, 0, 0, 0, 0, 0, 0, 0, 0], and the perturbation introduction of the illustrative embodiments above modifies the probability vector into [0.9, 0.1, 0.1, 0.1, 0.1, 0.1, 0.1, 0.1, 0.1, 0.1] before normalization. Normalization makes the final perturbed probability vector [0.5, 0.06, 0.06, 0.06, 0.06, 0.06, 0.06, 0.06, 0.06, 0.06]. Thus, the top-1 probability 1.0 becomes a significantly smaller value 0.5. This effect can be even more severe with a larger number of classes.

In order to minimize the amount of noise introduced into the trained model as a whole, in further illustrative embodiments, rather than introducing perturbations to all of the probabilities in the output of the trained model, e.g., neural network, a selective introduction of perturbations into select probability outputs may be performed. The selective introduction of perturbations may be performed with regard to a predetermined subset of the classifications and/or the size or amount of perturbation may be modified for all or a selected subset of the classifications. This selective insertion of perturbations and/or perturbation size modification may be performed dynamically. Moreover, this selective insertion of perturbations and/or perturbation size modification may be performed based on a variety of different dynamic modification criteria such as a request pattern analysis prediction that a source of requests is an attacker, a requestor specified level of acceptable model noise, a compensation based evaluation, a classification subset selection algorithm based on a top-K analysis, or the like. While example mechanisms will be described for selecting a subset of output classifications of a model into which to insert perturbations in the manner previously discussed above, and/or modifying the size or amount of the introduced perturbations, it should be appreciated that other criteria for selecting a subset of output classifications and/or modifying the size of introduced perturbations may be used without departing from the spirit and scope of the present invention.

A selective classification output perturbation engine is provided in further illustrative embodiments that comprises logic for specifying a subset of classification outputs into which to insert perturbations in the output of the trained model(s) and/or size of perturbation to insert into the output of the trained model(s). The selective classification output perturbation engine may be implemented, for example, as logic external to the trained model(s) and/or as an additional layer of logic nodes within the trained model(s), such as part of an additional layer of nodes just prior to the original output layer, and/or after the original output layer which operates on the output classification probability values to determine which classification outputs into which the introduce perturbations and/or sizes of perturbations to introduce into all or the selected subset of classification outputs. For example, in embodiments where the perturbations are inserted into all of the classification output probability values, such as in the previously described embodiments above, the selective classification output perturbation engine logic may operate as an additional layer prior to the output layer of nodes of the trained model(s) so as to introduce the perturbations into the output probability values prior to the output layer, but with the size of the perturbations being determined based on the operation of the selective classification output perturbation engine, as described hereafter.

In other illustrative embodiments, where the operation of the selective classification output perturbation engine operation is dependent upon the particular probability values for the various classifications actually generated by the trained model(s), such as a selection of the top-K classes based selection of classification outputs into which to insert perturbations, where in order to select the top-K classes, the logic needs to know which classifications are in the top-K classes, the selective classification output perturbation engine logic may be implemented as a logic layer present in the trained model(s) after the original output layer of logic and prior to an additional modified output layer of logic (nodes) of the trained model(s). In this case, the selective classification output perturbation engine logic operates on the original output probability values generated by the trained model, determines which subset of classification probability output values into which to introduce the perturbation, and controls the perturbation insertion engine to insert perturbations of a determined size and/or into a selected subset of classification outputs, and causes the trained model(s) to output the modified, or perturbed, output classification probabilities in a manner similar to that previously described above.

The operation of the selective classification output perturbation engine may be dynamically based on dynamic perturbation modification criteria such that one or more of a size/amount of the introduced perturbations and/or the particular classification probability output values output by the trained model(s) into which the perturbations are inserted may be dynamically changed as the trained model(s) operate to process input data, such as input data provide by requests submitted to the cognitive computing system, pipeline, or the like. This dynamic operation of the selective classification output perturbation engine may dynamically adjust the application of perturbations to outputs of the trained model(s) in response to predetermined situations or dynamic perturbation criteria being met by current circumstances. For example, the dynamic adjustment of perturbations may comprise modifying the particular classes of output probabilities into which the perturbations are introduced such that the perturbations are not introduced into all of the output classes of the trained model(s) based on the dynamic perturbation criteria. As another example, the amount, or size, of the perturbations introduced into the output probability values for all or a selected subset of the output probability values for classifications may be dynamically modified based on the dynamic perturbation criteria. These dynamic modifications of the perturbations may be made based on various dynamic perturbation criteria, such as evaluation of request/query patterns input to the trained model/neural network, cognitive computing system, or the like, an amount of noise in the outputs of the trained model(s) acceptable to the user, compensation tiers, a classification subset selection algorithm based on a top-K analysis, or the like.

In some illustrative embodiments, the dynamic modification of the perturbations may be made based on a determined importance of the particular input query. For example, a user may "opt-in" to paying a higher cost to have their query or queries identified as relatively more important than other queries by the same or different users. The more important queries may be provided with more accurate results with less perturbation, for example. In other illustrative embodiments, the perturbation may be dynamically modified on a per class basis based on the relative importance of the particular class. For example, one or more classifications may be defined as a "critical class" (relatively higher importance) while other classifications may be considered as not critical classes (relatively lower importance), such as tuberculosis (versus a common cold class) in a medical classifier scenario. For the critical (or important) classes, the amount of perturbation can be reduced to provide a more accurate result with regard to these critical classes such that a more accurate result may be provided to the medical practitioners with regard to the critical class.

Figure 7:
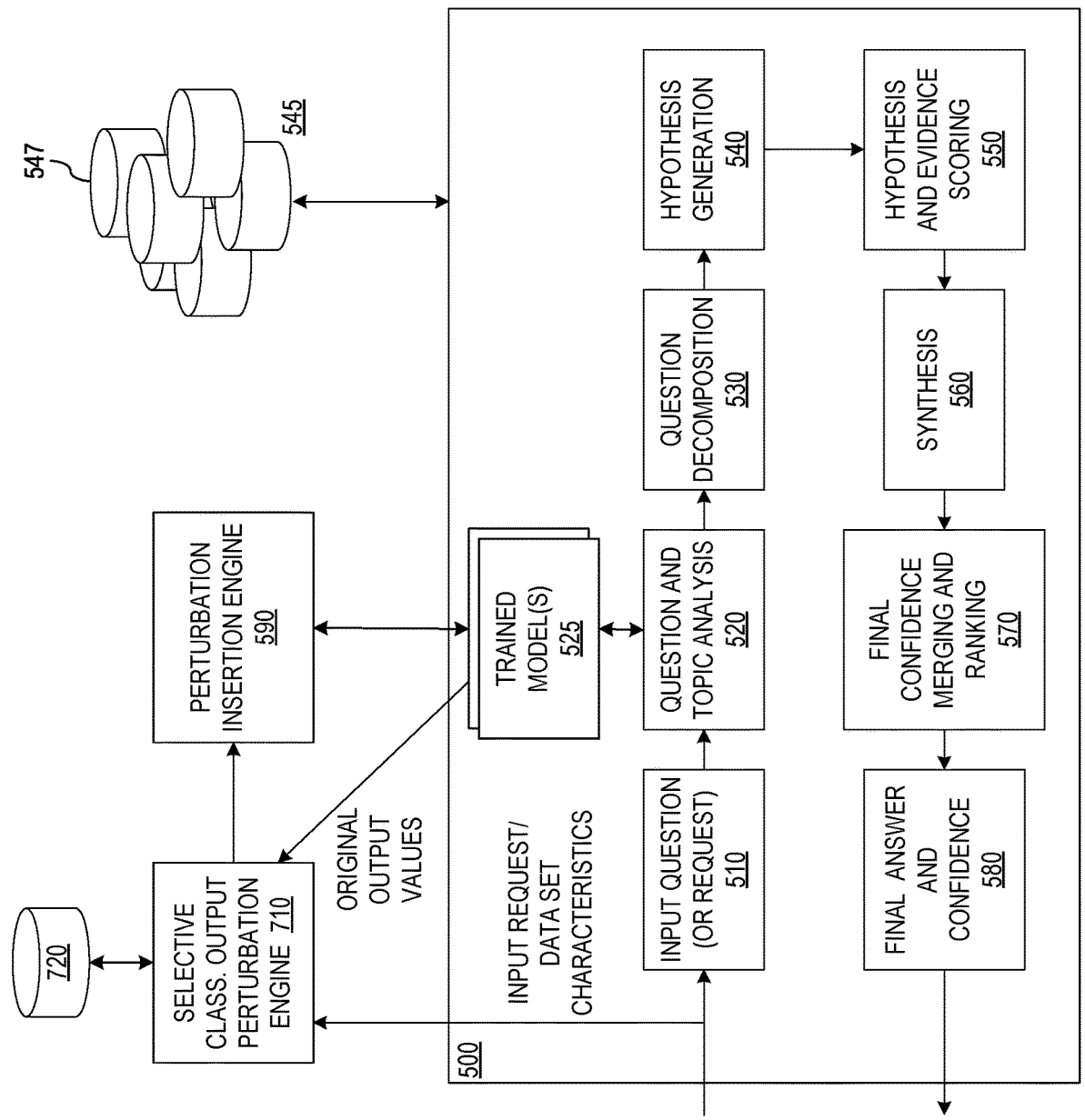
FIG. 7 illustrates an example of a cognitive system processing pipeline in which selective classification output perturbation is performed in accordance with one illustrative embodiment.

FIG. 7 illustrates an example of a cognitive system processing pipeline in which selective classification output perturbation is performed in accordance with one illustrative embodiment. FIG. 7 is similar to that of FIG. 5 but with the addition of the selective classification output perturbation engine 710 and the perturbation selection data storage 720 which are utilized by further illustrative embodiments to control selective introduction of perturbations by the perturbation insertion engine 590. While the logic of engines 710 and 590 are shown as separate from the trained model(s) 525, it should be appreciated that the logic may be integrated into each other, such as a modified perturbation insertion engine 590 comprising the logic of engine 710, or even combined into the logic of the trained model(s) 525 as additional logic layers prior to and/or after an original output layer of the trained model(s) 525, as discussed herein. Elements in FIG. 7 having reference numerals corresponding to those of FIG. 5 operate in a similar manner as described previously unless otherwise indicated hereafter. It should also be appreciated that the mechanisms of these further illustrative embodiments are likewise not limited to use with cognitive computing systems or with QA pipelines, but may be implemented with any trained model(s) performing classification operations.

As shown in FIG. 7, in addition to the mechanisms previously described above with regard to FIG. 5, the further illustrative embodiments include a selective classification output perturbation engine 710 which operates in concert with the perturbation insertion engine 590 so as to control the perturbation insertion performed by the perturbation insertion engine 590 to minimize the introduction of noise into the trained model(s) 525 while achieving the protections previously described above with regard to model stealing attacks and adversarial examples. That is, the perturbation insertion engine 590 of the illustrative embodiments operates to introduce perturbations into the probability values generated in the output vector while maintaining the accuracy of the classification as discussed above. However, the selective classification output perturbation engine 710 operates to minimize the amount of noise introduced due to the perturbation insertion by selecting at least one of a size of the introduce perturbations or a subset of classification outputs into which the perturbations are introduced, while maintaining the accuracy of the classifications. Thus, while correct classification is still provided downstream along the QA system pipeline 500, any attacker obtaining access to the output vector probability values for purposes of training their own model using a model stealing attack and/or adversarial examples, would be presented with inaccurate probability values that result in any model trained on such probability values providing lower performance than the trained model 525.

As with the previous illustrative embodiments, the perturbation insertion engine 590 operates to insert perturbations into the output probabilities generated by the trained model (s) 525 such that gradients calculated for points along a curve represented by the output probabilities deviate from a correct direction and amount and also minimize accuracy loss in the modified output classifications and corresponding labels. In some illustrative embodiments, the perturbation insertion engine 525 meets these criteria by using a perturbation function that reverses the sign of the first order derivative of the output probability curve, e.g., the sigmoid or softmax curve of the probability values, and adds noise or perturbations at the ends of the curve, near the maximum and minimum values of the curve, up to +/− half the range from the minimum value to the maximum value, e.g., in the case of a softmax or sigmoid probability value curve that ranges from 0% to 100%, the noise or perturbations have a magnitude of up to +/−0.5. As mentioned previously above, the particular perturbation function utilized may take many different forms including those previously listed above and others that meet the criteria and guidelines mentioned above.

The resulting modified output vector provides modified probability values while maintaining the correctness of the classification and associated labels that are associated with the input data in a labeled data set. Thus, correct classification and labeling of the input data set is still performed while obfuscating the actual trained configuration of the trained model(s) 525. The resulting classified or labeled data set may be provided to further stages of processing downstream in the pipeline 500, such as to question and topic analysis 520, for further processing and performance of the overall cognitive operation for which the cognitive system is employed.

Thus, an attacker is not able to submit a plurality of input data sets, obtain corresponding labeled output data sets and corresponding probability values of output vectors, and thereby train their own trained models to accurately replicate the training of the trained model(s) 525 by utilizing the labeled data set and its associated probability values in the vector output as training data. To the contrary, doing so would result in a model that provides significantly lower performance than that of the trained model(s) 525 resulting in a need to continue to utilize the trained model(s) 525.

In the further illustrative embodiment shown in FIG. 7, the selective classification output perturbation engine 710 operates to control the perturbation insertion engine 590 to instruct the perturbation insertion engine 590 as to the size of perturbation to introduce into one or more of the classification output probabilities and/or which classification output probabilities into which to insert the perturbations. The selection performed by the selective classification output perturbation engine 710 may be performed based on various selection criteria and selection data which may come from the input requests/queries processed by the trained model(s) 525, e.g., requests/queries input to the QA pipeline 500, the original output probability values generated by the trained model(s) 525, and/or data stored in perturbation selection data storage 720. As the selection performed by the selective classification output perturbation engine 710 may take many different forms, the following description will set forth examples of selection methodologies and logic implemented by various illustrative embodiments of the selective classification output perturbation engine 710, however it should be appreciated that other methodologies and logic may be implemented, as will become apparent to those of ordinary skill in the art in view of the present description, without departing from the spirit and scope of the present invention.

In some illustrative embodiments, the perturbation selection data storage 720 stores data that serves as a basis for performing selection of classification output probability values into which to insert perturbations and/or to select a size of perturbations to insert into the output probabilities of the trained model(s) 525. For example, the perturbation selection data storage 720 stores data indicating sources of requests, patterns of input data submitted by sources of requests, and the like. Moreover, the perturbation selection data storage 720 may store a register of registered owners/operators of the cognitive computing system, e.g., QA pipeline 500 and/or trained model(s) 525, which may include information specifying a desired selection methodology to implement for requests/input data from users (sources), a level of acceptable noise in the output probabilities of the trained model(s), a subscription or compensation level associated with an owner/operator which may be mapped to a size of perturbation introduced into the corresponding trained model(s) 525 and/or particular selection methodology to use to select a subset of probability value outputs into which to insert perturbations (noise), and the like. The registry may also store information about users (sources) to determine if users (sources) of requests are likely attackers or require heightened scrutiny. In some illustrative embodiments, the perturbation selection data storage 720 may not be provided and the selective classification output perturbation engine 710 may operate for all sources in the same manner, e.g., for all users (sources), the top-K output probability values will have perturbation insertion performed, where K is the same value for all users (sources).

In one illustrative embodiment, the selective classification output perturbation engine 710 operates based on a top-K selection methodology which selects the top-K ranked output probability values in the original output values generated by the trained model(s) 525 into which to insert the generated perturbations. For example, if K is "5", then the top 5 ranked output probability values will have their original output probability values perturbed by the insertion of perturbations by the perturbation insertion engine 590. The selective classification output perturbation engine 710 may receive the original output values generated by the trained model(s) 525 by processing the input data and may select the K highest valued output probability value classes to be the ones into which the perturbation insertion engine 590 will insert perturbations, rather than inserting perturbations into all of the output probability values of the trained model(s) 525. Thus, for example, if the original output probability values generated by the trained model 525 for classes C1, C2, C3, C4, C5, C6, C7, C8, C9, and C10 are 0.92, 0.72, 0.05, 0.12, 0.45, 0.32, 0.68, 0.22, 0.10, and 0.06, respectively, then for a K value of 4, the top-K selection methodology will select classes C1, C2, C5, and C7 as the classes into which the perturbations are inserted into their respective probability output values by the perturbation insertion engine 590 as these are the top-4 ranked output probability values in the set.

The selected class output probability values may be identified by selective classification output perturbation engine 710 based on the original output probability values generated by the trained model(s) 525 and control signals or output sent to the perturbation insertion engine 590 to instruct the perturbation insertion engine 590 which output probability values into which to insert the perturbations. The perturbation insertion engine 590 will then perform its operations, such as previously described above, with regard to the selected subset of classification output probability values so as to cause the trained model(s) 525 to output modified output probability values with regard the selected subset of classification output probability values.

By inserting the perturbation into only a selected subset of the output probability values for selected classes, the amount of noise introduced into the output of the trained model(s) 525 may be minimized while still being able to thwart any model stealing and/or adversarial example based attacks. That is, the overall amount of noise introduced into the outputs of the trained model(s) 525 is minimized while maintaining the utility of the output of the trained model(s) 525. However, even with the minimized introduction of noise, the effectiveness of the defense offered by the introduction of perturbations to thwart model stealing and adversarial example based attacks is still achieved since the classes into which the modified output probability values, generated by the trained model(s) 525 due to the introduction of the perturbations into the top-K output probability values, misclassifies will be one of the top-K classes that are affected by the deceptive perturbation.

It should be appreciated that the value of K is a tunable parameter, tunable between K=0 and K=max(K), with a potentially defined default K value for the desired implementation, and the K value utilized by the selective classification output perturbation engine 710 may be selected based on a desired implementation of the illustrative embodiments. The value of K may be fixed, or in some illustrative embodiments, K may be dynamically tunable based on a variety of different perturbation selection data which may be obtained from the input request, input data set being processed, output of the trained model(s), and/or data stored in the perturbation selection data storage 720, for example. For example, the selective classification output perturbation engine 710 may receive source identification information, session information, and/or characteristic information for the input requests/data sets being submitted to the cognitive computing system and/or trained model(s) 525, from the input requests, and may receive stored information from the perturbation selection data storage 720, and may dynamically determine a value of K to use in the top-K selection algorithm based on an analysis of one or more of these data. For example, in some illustrative embodiments, the selective classification output perturbation engine 710 may perform pattern analysis logic on the input data of one or more requests from the same source to determine if the pattern is representative of an attack on the trained model(s) 525 and/or the cognitive computing system as a whole. This pattern analysis may make use of stored information in the perturbation selection data storage 720. This stored information may include requests received from the same source during a same session, multiple sessions, over a predetermined period of time, or the like.

The selective classification output perturbation engine 710 may use a classification model, such as another trained neural network or the like, operating on various features extracted from the input request/data set, a history of requests/data sets received from the same source, or the like, to evaluate features of the requests and input data sets to predict whether an input request from a source is part of an attack on the trained model(s) 525. For example, if the same source has sent a large number of requests, or a large data set, with similar input data, e.g., images, for classification, over a predetermined period of time, within the same session, or the like, then this may be indicative of an attack. If the source is located in certain geographical areas known to be areas where attacks have emanated from, as may be determined from an IP address or the like, then the selective classification output perturbation engine 710 may determine that the request is likely part of an attack or has a high probability of being associated with an attack. If the source is not a registered source, then heightened scrutiny may be applicable and thus, the engine 710 may determine a high likelihood that the request is part of an attack. Other analysis of characteristics of the request and/or input data may be performed to evaluate a likelihood that the request is part of an attack.

If the request/input data is determined to likely be part of an attack, e.g., a prediction value equal to or greater than a predetermined threshold, then increased noise may be input to the output probability values generated by the trained model(s) 525. This increase in noise introduction may be to increase the value of K than would otherwise be utilized, e.g., if a default K value is 4, the value of K may be increased to 10 or all output classifications. As can be seen, this modification of the amount of noise introduced into the output of the trained model(s) 525 may be performed dynamically based on an evaluation of the request/input data sets being received and an evaluation of the sources of the requests.

The dynamic modification of the amount of noise introduced into the output of the trained model(s) 525 by the perturbation insertion engine 590 is not limited to predicting whether requests/data sets are associated with attacks, but may also be performed based on trained model(s) 525 owners/operators desired level of noise introduction through the insertion of perturbations. This desired level may be determined based on a registry of trained model owner information maintained as part of the perturbation selection data storage 720. For example, different trained model(s) 525 owners/operators may want different levels of protection for their trained model(s) 525, which may be based on operating performance, an amount of protection that the owners/operators can afford from a financial perspective, or the like. For example, owners/operators may want to have more or less protections based on desired performance of the trained model(s) 525. For those owners/operators that want increased protections, relatively higher amounts of noise may be introduced into the output probability values generated by their trained model(s) 525, e.g., increased K value, above a default K value, in the top-K algorithm described above. For those owners/operators that do not want increased protections, either the default noise or lower amounts of noise may be introduced into the output probability values generated by their trained model(s) 525, e.g., default K value or decreased K value, below the default K value, in the top-K algorithm described above.

In some illustrative embodiments, different tiers of protection may be provided with different costs to trained model 525 owners/operators. Thus, if an owner/operator subscribes to a higher tier level corresponding to a higher level of protection, more noise may be introduced into the outputs of their trained model(s) than in lower level protections or a higher performance may be achieved than for lower level protection tiers. Alternatively, higher tiers may be associated with a more selective input of noise into the trained model(s) such that owners/operators that subscribe to lower tiers will have more noise introduced, e.g., the same size perturbations introduced to all output classification probability values, while owners/operators that subscribe to higher tiers may have minimized inserted noise, i.e. a selective classification output perturbation in accordance with the further illustrative embodiments is performed.

Thus, depending on the particular implementation, different customizations of the dynamic selection of classification output probability values into which to insert perturbations may be achieved. The customization may be based on the particular trained model(s) 525 being used to process the input request/data set. For example, if the request targets or requests a particular operation that is performed by a particular trained model 525, the corresponding owner/operator information from the registry stored in the perturbation selection data storage 720 may be retrieved, by the selective classification output perturbation engine 710, and used along with the original output values from the trained model(s) 525) to determine which top-K output probability values into which to insert perturbations. This information is then used to generate a control signal or output to the perturbation insertion engine 590 to cause the perturbation insertion engine 590 to perform the perturbation insertion with regard to the selected subset of output classification probability values to thereby generate the modified classification probability values.

In other illustrative embodiments, the size or amount of the perturbation inserted into the classification output probability values generated by the trained model(s) 525 may be modified so as to minimize the amount of noise introduced overall to the output of the trained model 525. For example, the size/amount of the perturbation may be increased/decreased based on various criteria, such as those discussed above for dynamically modifying the K value for a top-K algorithm based on source, owner/operator registry information, pattern analysis indicating likelihood that the request is part of an attack, or the like. For example, using a top-K approach such as described previously, the top-K original output values may be identified and the perturbations inserted into these top-K original output values may be increased while all other original output values will have a smaller size/amount of perturbation inserted into their original output probability values, e.g., top-K values have perturbations increased by 0.05 while all other values have perturbations decreased by 0.05 from a default perturbation size/amount. Alternatively, if an owner/operator subscribes to a higher tier of protection, increased size perturbations may be utilized than for owners/operators that subscribe to relatively lower tiers of protection. Various customizations of the size of perturbations may be performed so as to control the amount of noise introduced into the outputs of the trained model(s) 525 may be performed without departing from the spirit and scope of the present invention.

Moreover, the customizations and dynamic modifications may be performed with regard to both size/amount of perturbations as well as the subset of classification output probability values to which the perturbations are inserted. These customizations may again be based on the particular original output values generated by the trained model(s) 525, request/input data set characteristics extracted from the received requests flowing into the cognitive computing system and/or trained model(s) 525, and/or the stored information in the perturbation selection data storage 720. Thus, larger or smaller size perturbations may be introduced into outputs of the trained models 525 based on whether or not the source is likely considered to be an attacker, the request/input data set is likely considered to be an attacker, the subscriber's preferences for levels of noise insertion into the outputs of the trained model(s) 525, or the like. Moreover, more or fewer class prediction outputs may have inserted perturbations (noise) based on whether or not the source is likely considered to be an attacker, the request/input data set is likely considered to be an attacker, the subscriber's preferences for levels of noise insertion into the outputs of the trained model(s) 525, or the like.

It should be appreciated that the perturbation selection data storage 720 may store the preferences of the owners/operators of the trained model(s) 525 with regard to whether to use one or both types of perturbation (noise) insertion controls and the extent to which to use one or both of these types of perturbation insertion controls. For example, preferences may be stored in the registry of data storage 720 indicating that a particular owner/operator may want to use only top-K selection controls of the perturbation insertion engine, and may specify a desired or default K value with criteria for determining if and when to modify the K value by increasing/decreasing, e.g., criteria for determining if a request is part of an attack. For another owner/operator of the trained model(s) 525, different preferences and/or criteria for dynamically modifying the controlling the perturbation insertion may be specified, e.g., use both top-K selection and perturbation size controls with specified criteria for increasing/decreasing K and/or increasing/decreasing perturbation size. The selective classification output perturbation engine 710 may retrieve the appropriate registry entries for the corresponding trained model(s) 525 being used to process the request/input data set and generate corresponding perturbation insertion control signals or outputs sent from the selective classification output perturbation engine 710 to the perturbation insertion engine 590.

In some illustrative embodiments, the dynamic controlling of the perturbation insertion so as to customize the inserted noise in the outputs of the trained model(s) 525 may be based on a determined importance of the received request/data set. With such mechanisms, relatively more important requests/data sets will have relatively lower amounts of noise introduced into the outputs of the trained model(s) 525 by performing selective classification output perturbation so select either a subset of classification output probability values to introduce perturbations into, modify a size of the perturbations to reduce the size of the perturbations so as to reduce noise, or both. As noted previously, the "importance" of requests/data sets (or queries) may be based on various factors, including, for example, a user marking the requests/data sets with a higher rating or ranking (different tiers of requests/data sets) and potentially paying a premium cost for relatively more important requests/data sets. In some embodiments, a predetermined list of critical classes, or "important" classes (again different "tiers" of importance), may be defined and the importance of a request/data set may be determined based on these importance tiers. For example, a top tier classifications (e.g., "cancer", "heart attack", "stroke", etc.) may have no perturbation introduced, whereas lower tier classifications (e.g., "tuberculosis", "flu", etc.) may have small perturbations introduced. The lowest tier classifications, e.g., "cold", may have larger perturbations (more noise) introduced. For different tiers, a function or a predefined scaling factor may be provided to add the perturbation such that 0 indicates adding no perturbation and 1 indicates adding full, or a maximum, perturbation.

It should be kept in mind that, for any of the dynamically modified perturbation selections or customizations, the amount of reduction is limited to a level where model stealing attacks or adversarial example based attacks (evasion attacks) are still thwarted by the gradient deception mechanisms of the illustrative embodiments. Thus, there is a range of noise within which the dynamic modification of the inserted perturbations may be adjusted, e.g., a range comprising an upper limit where too much noise is introduced to allow proper classification outputs by the trained machine learning model(s) and a lower limit where too little noise is introduced to adequately thwart attacks. Theoretically, for top "k" embodiments, k can be equal to or greater than 1. The defensive effect of the illustrative embodiments should be there for k=1 as the gradient toward or away from the top-1 class can be still deceptive in this case. As k increases, the number of such classes with deceptive directions increases. For model evasion and stealing, the most informative direction is top-1 class. So, the effect is still there. The size of perturbation depends on the particular method to inject such noise, which may be determined empirically.

While a top-K selection and perturbation size controls are described above, it should be appreciated that various embodiments of the present invention may implement other controls for modifying the amount of noise introduced without departing from the spirit and scope of the present invention. In fact, in some illustrative embodiments, whether to add noise or not as a whole can be an option. For example, as described previously, a top-tier query can have no perturbation while lower tier can have noise to all classes. Moreover, in some embodiments, if important or critical classes are defined, noise (perturbations) may be selectively applied to non-important classes only.

In another embodiment, dynamic control of the introduction of perturbations can be based on risk assessment. For example, a query pattern analysis engine or artificial intelligence (AI) model may analyze a sequence of queries (requests/input data sets) originating from the same source to determine if the pattern represents a potential malicious action. For example, adversarial example generation typically requires querying similar images multiple times. As a source submits more queries with similar images, e.g., multiple images of stop signs within a predetermined period of time, within the same session, or the like, the query pattern analysis engine or AI model can detect this pattern and control the perturbation insertion engine to gradually add more noise, e.g., larger perturbations, or increase k in a top-K based mechanism, so as to increase noise in queries suspected of being part of an attack on the trained model, e.g., a model stealing attack or an evasion attack.

In some embodiments, instead of top-K based mechanism, a predefine set of critical or important classes, or all/nothing, the mechanisms of the illustrative embodiments may also add noise to a random set of classes. That is, the particular classes to which noise is introduced may be determined dynamically and randomly but while still maintaining the amount of noise introduced into the model as a whole to be at an acceptable level. For example, in some embodiments, a predetermined number of classes may be selected for introduction of noise, however the particular classes selected may not be known a priori. In short, any mechanism that allows for the selection of a subset of classes into which noise is introduced, and/or the selection of different levels of perturbation to be introduced, may be used without departing from the spirit and scope of the present invention.

Thus, these further illustrative embodiments provide mechanisms for minimizing the amount of noise introduced into the outputs of the trained model(s) 525 by the insertion of perturbations into the outputs of the trained model(s) 525 by the perturbation insertion engine 590. The minimization of noise helps to avoid the problems with dilution of the output classification probability values discussed above while maintaining the utility of the gradient deception mechanisms to thwart model stealing attacks and adversarial example based attacks. The amount of noise minimization may be a tunable characteristic of the illustrative embodiments and may be tuned according to static or dynamic criteria, such as model owner/operator preferences, subscription or other compensation levels, importance of requests/data sets being processed, patterns of activity indicative of likelihood of requests/data sets being part of an attack, evaluation of sources of requests/data sets with regard to likelihood of the sources being attackers, etc.

Figure 8:
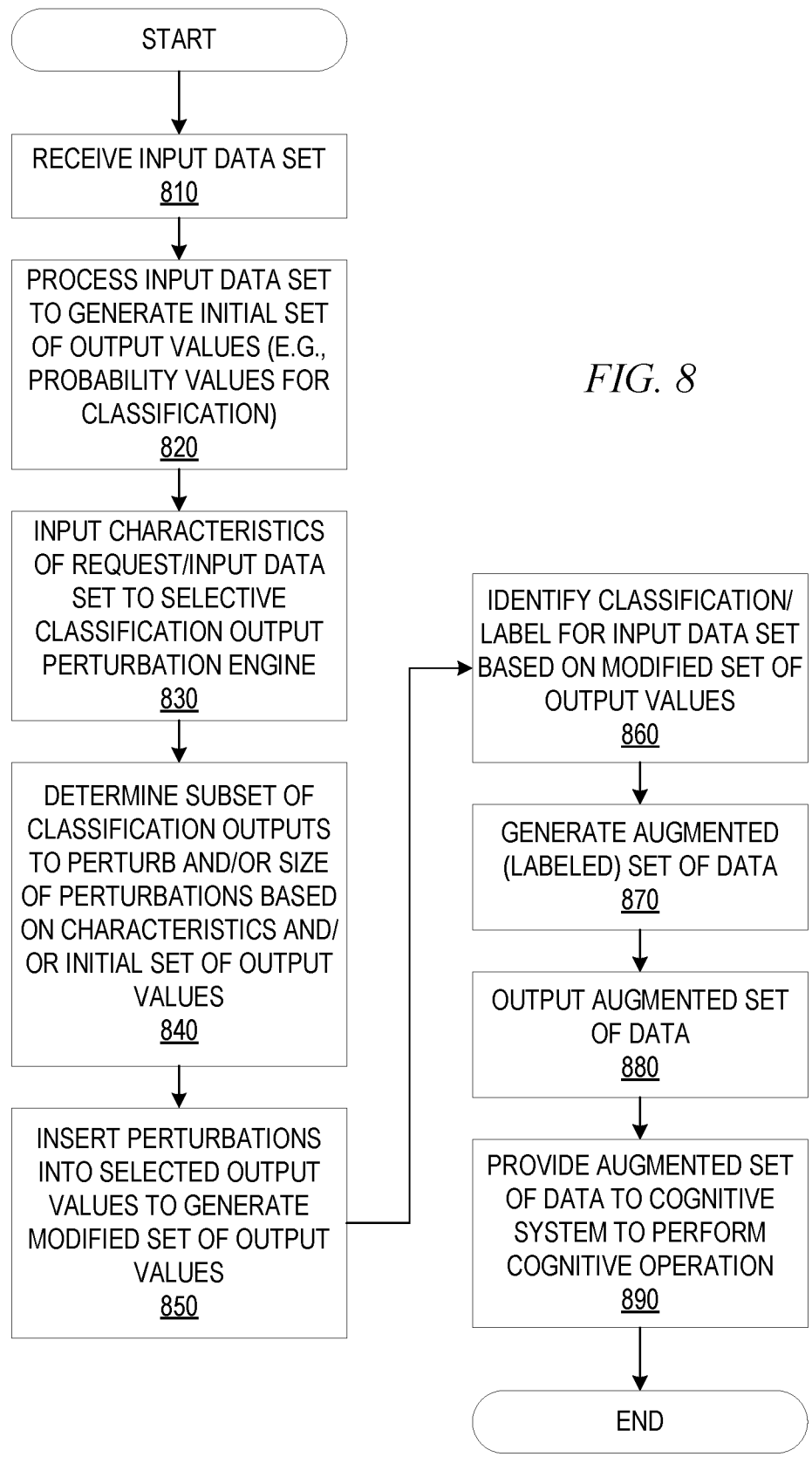
FIG. 8 is a flowchart outlining an example operation of a further illustrative embodiment in which dynamic modification of perturbation insertion is performed.

FIG. 8 is a flowchart outlining an example operation of a further illustrative embodiment in which dynamic modification of perturbation insertion is performed. The operation outlined in FIG. 8 may be performed, for example, by the selective classification output perturbation engine 710 in FIG. 7, for example, in concert with the perturbation insertion engine 590 so as to control the size of perturbations inserted into the output classification probability values generated by the trained model(s) 525 and/or the insertion of perturbations to a selected subset of output classification probability values generated by the trained model(s) 525).

As shown in FIG. 8, the operation starts by receiving a request to process an input data set, which may also be provided or may otherwise be accessed as a result of the request (step 810). The input data set is processed by a trained model to generate an initial set of output values (step 820). Characteristics of the received request, e.g., source identifier (IP address, name of user, etc.), session identifier, requested classification operation to be performed, importance indicator of the request, etc., and/or characteristics of the input data set, e.g., number and types of data being processed, e.g., types of images or the like, may be extracted from the request/input data set and provides as input to the selective classification perturbation engine along with the initial set of output values generated by the model (step 830). A subset of classification outputs to perturb and/or a size of perturbation to introduce into the output classification probability values is determined based on the extracted characteristics and the initial set of output values (step 840). This operation may take many different forms depending on the type of customization and dynamic modifications enabled by the particular selected embodiment and its implementation. For example, top-K analysis may be performed to select the top K classification outputs, in the initial set of outputs, to perturb with the insertion of perturbations, where the value of K may be a fixed value or a value determined dynamically based on other factors as previously described above. Moreover, source information may be used to predict whether the source is likely an attacker, and owner/operator information may be evaluated to determine a desired level of noise to introduce into the outputs of the model.

After determining the controls on the perturbation insertion in step 840, the perturbation insertion engine is controlled to insert the perturbations of the selected size and/or into the selected subset of outputs to generate a modified set of output values (step 850). The modified set of output values are used to identify classifications/labels for the input data set (step 860) and generate an augmented output set of data that is augmented to include labels corresponding to the classification identified by the modified set of output values (step 870). The augmented (labeled) data set, which may include the modified set of output values, is then output (step 880). Thereafter, the augmented (labeled) data set may be provided as input to a cognitive computing operation engine that processes the labeled data set to perform a cognitive operation (step 890). The operation then terminates.

It should be appreciated that while FIG. 8 includes steps 860-890 as part of the example operation, the operation in some illustrative embodiments, may end at step 850 and steps 860-890 need not be included. That is, rather than classification/labeling and cognitive computing operation, as is performed in steps 860-890, the modified output values (step 850) may be output for use either by a user or other computing system. Thus, the user and/or other computing system may operate on the modified output values themselves and may not utilize classifications/labels as provided in steps 860-890.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for obfuscating a trained configuration of a trained machine learning model, the method being performed in a data processing system comprising at least one processor and at least one memory, the at least one memory comprising instructions executed by the at least one processor to specifically configure the at least one processor to implement the trained machine learning model and a perturbation insertion engine, the method comprising:
processing, by the trained machine learning model having a machine learning trained configuration, input data to generate an initial output vector having classification values for each of a plurality of predefined classes;
determining, by the perturbation insertion engine, a subset of classification values in the initial output vector into which to insert perturbations, wherein the subset of classification values is less than all of the classification values in the initial output vector;
determining, by the perturbation insertion engine, a size of a perturbation to insert into the subset of classification values;
modifying, by the perturbation insertion engine, classification values in the subset of classification values by inserting a perturbation in a function associated with generating the output vector for the classification values in the subset of classification values, to thereby generate a modified output vector; and
outputting, by the trained machine learning model, the modified output vector, wherein the perturbation modifies the subset of classification values to obfuscate the trained configuration of the trained machine learning model while maintaining accuracy of classification of the input data.

2. The method of claim 1, wherein at least one of determining the subset of classification values in the output vector into which to insert perturbations or determining the size of the perturbation to insert into the subset of classification values comprises evaluating characteristics of at least one of a request submitting the input data, the input data itself, or an operator of the trained machine learning model, to dynamically determine the subset of classification values or the size of the perturbation.

3. The method of claim 1, wherein determining the subset of classification values in the output vector into which to insert perturbations comprises evaluating characteristics of at least one of a request submitting the input data, the input data itself, or an operator of the trained machine learning model, to dynamically determine the subset of classification values.

4. The method of claim 3, wherein evaluating the characteristics comprises evaluating the characteristics to determine a probability that the request or input data is part of an attack on the trained machine learning model, and wherein the subset of classification values is determined based on results of determining the probability that the request or input data is part of an attack on the trained machine learning model.

5. The method of claim 4, wherein determining the probability that the request or input data is part of an attack comprises at least one of determining whether the source of the request or input data is located in a geographic area associated with attackers, determining whether a pattern of activity associated with the source is indicative of an attack on the trained machine learning model, or determining whether or not the source is a previously registered user of the trained machine learning model.

6. The method of claim 1, wherein determining the subset of classification values in the output vector into which to insert perturbations comprises performing a top-K analysis of the classification values in the initial output vector, where K is one of a fixed predetermined integer value or a dynamically determined integer value.

7. The method of claim 6, wherein K is a dynamically determined integer value, and wherein a value of K is determined based on at least one of one or more characteristics of a request submitting the input data, characteristics of the input data, or characteristics of an operator of the trained machine learning model.

8. The method of claim 1, wherein inserting the perturbation in the function associated with generating the output vector comprises inserting a perturbation that changes a sign or a magnitude of a gradient of the output vector.

9. The method of claim 1, wherein modifying classification values in the subset of classification values by inserting a perturbation in the function associated with generating the output vector for the classification values in the subset of classification values comprises adding noise to an output of the function up to a maximum value, positive or negative, that does not modify the classification of the input data.

10. A computer program product comprising a non-transitory computer readable medium having a computer readable program stored therein, wherein the computer readable program, when executed on a data processing system, causes the data processing system to implement a trained machine learning model and a perturbation insertion engine, which operate to:
receive, by the trained machine learning model, input data for classification into one or more classes in a plurality of predefined classes as part of a cognitive operation of the cognitive system;
process, by the trained machine learning model, the input data to generate an initial output vector having classification values for each of the plurality of predefined classes;
determine, by the selective classification output perturbation engine, a subset of classification values in the initial output vector into which to insert perturbations, wherein the subset of classification values is less than all of the classification values in the initial output vector;
determine, by the perturbation insertion engine, a size of a perturbation to insert into the subset of classification values;
modify, by the perturbation insertion engine, classification values in the subset of classification values by inserting a perturbation in a function associated with generating the output vector for the classification values in the subset of classification values, to thereby generate a modified output vector; and
output, by the trained machine learning model, the modified output vector, wherein the perturbation modifies the subset of classification values to obfuscate the trained configuration of the trained machine learning model while maintaining accuracy of classification of the input data.

11. The computer program product of claim 10, wherein at least one of determining the subset of classification values in the output vector into which to insert perturbations or determining the size of the perturbation to insert into the subset of classification values comprises evaluating characteristics of at least one of a request submitting the input data, the input data itself, or an operator of the trained machine learning model, to dynamically determine the subset of classification values or the size of the perturbation.

12. The computer program product of claim 10, wherein the computer readable program further causes the data processing system to determine the subset of classification values in the output vector into which to insert perturbations at least by evaluating characteristics of at least one of a request submitting the input data, the input data itself, or an operator of the trained machine learning model, to dynamically determine the subset of classification values.

13. The computer program product of claim 12, wherein the computer readable program further causes the data processing system to evaluate the characteristics at least by evaluating the characteristics to determine a probability that the request or input data is part of an attack on the trained machine learning model, and wherein the subset of classification values is determined based on results of determining the probability that the request or input data is part of an attack on the trained machine learning model.

14. The computer program product of claim 13, wherein the computer readable program further causes the data processing system to determine the probability that the request or input data is part of an attack at least by at least one of determining whether the source of the request or input data is located in a geographic area associated with attackers, determining whether a pattern of activity associated with the source is indicative of an attack on the trained machine learning model, or determining whether or not the source is a previously registered user of the trained machine learning model.

15. The computer program product of claim 10, wherein the computer readable program further causes the data processing system to determine the subset of classification values in the output vector into which to insert perturbations at least by performing a top-K analysis of the classification values in the initial output vector, where K is one of a fixed predetermined integer value or a dynamically determined integer value.

16. The computer program product of claim 15, wherein K is a dynamically determined integer value, and wherein a value of K is determined based on at least one of one or more characteristics of a request submitting the input data, characteristics of the input data, or characteristics of an operator of the trained machine learning model.

17. The computer program product of claim 10, wherein the computer readable program further causes the data processing system to insert the perturbation in the function associated with generating the output vector at least by inserting a perturbation that changes a sign or a magnitude of a gradient of the output vector.

18. An apparatus comprising:
a processor; and
a memory coupled to the processor, wherein the memory comprises instructions which, when executed by the processor, cause the processor to implement a trained machine learning model and a perturbation insertion engine, which operate to:
receive, by the trained machine learning model, input data for classification into one or more classes in a plurality of predefined classes as part of a cognitive operation of the cognitive system;
process, by the trained machine learning model, the input data to generate an initial output vector having classification values for each of the plurality of predefined classes;
determine, by the selective classification output perturbation engine, a subset of classification values in the initial output vector into which to insert perturbations, wherein the subset of classification values is less than all of the classification values in the initial output vector;
determine, by the perturbation insertion engine, a size of a perturbation to insert into the subset of classification values;
modify, by the perturbation insertion engine, classification values in the subset of classification values by inserting a perturbation in a function associated with generating the output vector for the classification values in the subset of classification values, to thereby generate a modified output vector; and
output, by the trained machine learning model, the modified output vector, wherein the perturbation modifies the subset of classification values to obfuscate the trained configuration of the trained machine learning model while maintaining accuracy of classification of the input data.

19. The apparatus of claim 18, wherein determining the subset of classification values in the output vector into which to insert perturbations comprises evaluating characteristics of at least one of a request submitting the input data, the input data itself, or an operator of the trained machine learning model, to dynamically determine the subset of classification values.

20. The apparatus of claim 19, wherein evaluating the characteristics comprises evaluating the characteristics to determine a probability that the request or input data is part of an attack on the trained machine learning model, and wherein the subset of classification values is determined based on results of determining the probability that the request or input data is part of an attack on the trained machine learning model.

* * * * *